(12) United States Patent  
Casselman

(10) Patent No.: US 8,145,894 B1  
(45) Date of Patent: Mar. 27, 2012

(54) RECONFIGURATION OF AN ACCELERATOR MODULE HAVING A PROGRAMMABLE LOGIC DEVICE

(75) Inventor: Steven Mark Casselman, Sunnyvale, CA (US)

(73) Assignee: DRC Computer Corporation, Sunnyvale, CA (US)

( * ) Notice: Subject to any disclaimer, the term of this patent is extended or adjusted under 35 U.S.C. 154(b) by 495 days.

(21) Appl. No.: 12/392,038

(22) Filed: Feb. 24, 2009

Related U.S. Application Data

(60) Provisional application No. 61/067,182, filed on Feb. 25, 2008.

(51) Int. Cl.  
*G06F 15/177* (2006.01)

(52) U.S. Cl. .................. 713/100; 713/1; 713/2

(58) Field of Classification Search ............ 713/1, 2, 713/100  
See application file for complete search history.

(56) References Cited

U.S. PATENT DOCUMENTS

| | | | | |
|---|---|---|---|---|
| 6,011,407 A | * | 1/2000 | New .............................. | 326/39 |
| 6,359,897 B1 | * | 3/2002 | Hessel et al. .................. | 370/429 |
| 6,389,078 B1 | * | 5/2002 | Hessel et al. .................. | 375/259 |
| 6,754,763 B2 | * | 6/2004 | Lin .............................. | 710/317 |
| 7,372,848 B2 | * | 5/2008 | Doerr et al. .................... | 370/352 |
| 7,676,649 B2 | * | 3/2010 | Rapp et al. ..................... | 712/43 |
| 7,689,726 B1 | * | 3/2010 | Sundararajan et al. ......... | 710/8 |
| 7,856,545 B2 | * | 12/2010 | Casselman ..................... | 712/34 |
| 2003/0217254 A1 | * | 11/2003 | Page et al. ..................... | 713/2 |
| 2004/0236556 A1 | * | 11/2004 | Lin ............................... | 703/14 |
| 2008/0028186 A1 | | 1/2008 | Casselman | |
| 2008/0028187 A1 | | 1/2008 | Casselman | |
| 2008/0205366 A1 | * | 8/2008 | Wang et al. .................... | 370/342 |
| 2008/0309393 A1 | * | 12/2008 | Sun et al. ....................... | 327/298 |

OTHER PUBLICATIONS

Blume, et al. Integration of High-Performance ASICs Into Reconfigurable Systems Providing Additional Multimedia Functionality, 2000, IEEE.

Fawcett, Taking Advantage of Reconfigurable Logic, 1994, IEEE.

Unpublished U.S. Appl. No. 12/182,792, filed Jul. 30, 2008, entitled "Reboot Reconfiguration of an Accelerator Module Having a Programmable Logic Device", inventor: Michael Monkang Chu. [Co-pending, commonly owned application.].

* cited by examiner

*Primary Examiner* — Nitin Patel  
(74) *Attorney, Agent, or Firm* — The Webostad Firm

(57) ABSTRACT

Reconfiguration of an accelerator module having a programmable logic device is described, where the reconfiguration is performed during runtime without rebooting. For example, a computer is put into a sleep mode, the computer having the accelerator module installed therein. A programmable logic device of the accelerator module is reconfigured while the computer is in the sleep mode.

25 Claims, 13 Drawing Sheets

900

| BANK 5  |        | BANK 6  |
| ------- | ------ | ------- |
| BANK 9  | BANK 3 | BANK 10 |
| BANK 13 | BANK 1 | BANK 14 |
| BANK 15 | BANK 2 | BANK 16 |
| BANK 11 | BANK 4 | BANK 12 |
| BANK 7  |        | BANK 8  |

FIG. 9

RECONFIGURATION OF AN ACCELERATOR MODULE HAVING A PROGRAMMABLE LOGIC DEVICE

FIELD

The invention relates generally to computer systems and, more particularly, to a reconfiguration of an accelerator module having a programmable logic device.

BACKGROUND

Co-processors have been used to accelerate computational performance. For example, some early microprocessors did not include floating-point circuitry due to integrated circuit die area limitations. As used herein, "include" and "including" mean including without limitation. Unfortunately, performing floating-point computations in software can be quite slow.

Accordingly, a co-processor configured to work with a microprocessor was created. Instructions for the co-processor could thus be passed through the microprocessor, such as for performing a floating-point computation for example. As integrated circuit technology improved, microprocessor and co-processor were combined together in a single die. So, for example, some recent microprocessors are capable of performing floating-point operations.

Still, conventional microprocessors have a fixed set of circuitry for carrying out instructions from their Instruction Set Architecture ("ISA"). So while instructions from an ISA may be used for carrying out computational algorithms in a conventional microprocessor, the execution of such instructions is limited to the fixed set of circuitry of the microprocessor. In short, microprocessors may not be well suited for carrying out some complex algorithms or highly specialized algorithms, and thus execution of such algorithms as program applications using a microprocessor may be slow.

More recently, multi-microprocessor computing systems have been implemented. In such systems, one microprocessor may act as a Central Processing Unit ("CPU") and one or more others of such microprocessors may act as auxiliary processors to improve computational throughput. However, such microprocessors are still limited to their fixed set of circuitry and associated ISA, and thus may still be relatively slow when executing complex algorithms or highly specialized algorithms.

A microprocessor interface conventionally has more available pins than an edge connector associated with a peripheral circuit board interface. Conventionally, a socket may be attached to a microprocessor interface of a motherboard to facilitate addition of a microprocessor, which may be added after manufacture of the motherboard. Thus, in some instances, motherboards are sold separately from microprocessors.

Programmable Logic Devices ("PLDs"), such as those that have field programmable gates which may be arrayed as in Field Programmable Gate Arrays ("FPGAs") for example, have programmable logic that may be tailored for carrying out various tasks. For purposes of clarity by way of example and not limitation, FPGAs are described below; however, it should be understood that other integrated circuits that include programmable logic, such as field programmable gates, may be used.

Execution of complex algorithms or highly specialized algorithms may be done in hardware via programmable logic tailored to carry out such algorithms. Executing of complex algorithms or highly specialized algorithms instantiated, in whole or in part, in programmable logic may be substantially faster than executing them in software using a microprocessor or microprocessors.

However, motherboards or system boards capable of handling one or more microprocessors are more common in computing systems than PLDs, such as FPGAs for example, for a variety of known reasons. Accordingly, some developers have created FPGA accelerators implemented as expansion cards that plug into one or more peripheral circuit board edge connection slots of a motherboard. However, expansion board FPGA accelerators ("peripheral accelerators") are limited by the edge connection interface pin density and associated performance of the peripheral communication interface with which they interconnect. An example of a peripheral interface is a Peripheral Component Interface ("PCI"). A peripheral circuit board interface, such as a PCI for example, is relatively slow as compared with a microprocessor interface. Examples of microprocessor interfaces include a Front Side Bus ("FSB") and a HyperTransport ("HT") link, among other types of microprocessor interfaces.

A configuration bitstream or a partial bitstream may be pre-designed to provide one or more functional blocks when instantiated in programmable logic. Such a pre-designed bitstream or partial bitstream is conventionally derived from what is generally referred to as a "core." For example, an HT link core is available from Xilinx, Inc. for providing a configuration bitstream that may be instantiated in an FPGA from that vendor. Conventionally, a core is usable in a variety of applications; however, a core may include pre-defined placement or pre-defined routing, or a combination thereof. These types of pre-designed cores are sometimes known as "floor-planned" cores. Such floor-planned cores may be pre-designed for a particular family of products. Additionally, cores may allow a user to enter parameters to activate functionality, change functionality, and adjust interface parameters, among other known parameterizations.

SUMMARY

One or more aspects generally relate to computer systems and, more particularly, to a reconfiguration of an accelerator module having a programmable logic device.

An aspect generally relates to a method for reconfiguration of an accelerator module. A computer is put into a sleep mode, the computer having the accelerator module installed therein. A programmable logic device of the accelerator module is reconfigured while the computer is in the sleep mode.

Another aspect generally relates to a method for reconfiguration of a programmable logic device, including: coupling the programmable logic device to a first microprocessor socket for communication with another microprocessor coupled to second microprocessor socket; and reconfiguring the programmable logic device at runtime while coupled to the microprocessor socket.

Yet another aspect generally relates to a method for pre-conditioning an accelerator module for reconfiguration responsive to a sleep mode of a computer having the accelerator module. A driver program for the accelerator module is loaded into the computer for execution thereof. Configuration and power interface registers are set to a duration of time for a sleep mode sufficient for the reconfiguration of a first programmable logic device of the accelerator module. Interface settings are negotiated for communication between a microprocessor of the computer and the accelerator module. The interface settings negotiated are stored. Base and interrupt addresses are assigned to the first programmable logic device. The base and interrupt addresses are loaded into the first programmable logic device. The base and interrupt addresses are stored in system memory of the computer external to the accelerator module for shadowing thereof responsive to the execution of the driver program.

Still yet another aspect relates generally to computer-readable instructions tangibly embodied in an article of manufacture having at least one computer-readable medium, the computer-readable instructions executable by a computer having access to the at least one computer-readable medium to perform a method. An accelerator module of the computer is preconditioned for reconfiguration responsive to a reboot of the computer. The preconditioning includes initiating a load of configuration data to volatile memory of the accelerator module. The load includes configuring a transport interface in programmable logic of a programmable logic device of the accelerator module; passing the configuration data using the transport interface for sending to the volatile memory; and writing the configuration data to the volatile memory. The preconditioning also includes setting a bit of a controller to read the configuration data from the volatile memory for the reconfiguration of the programmable logic of the programmable logic device of the accelerator module responsive to the reboot of the computer.

Further still another aspect relates generally to a method for reconfiguring an accelerator module having a programmable logic device. The accelerator module is coupled to a central processing unit interface of a computer. Programmable logic of the programmable logic device is configured with a first configuration bitstream, and then reconfigured with either the first configuration bitstream or a second configuration bitstream during runtime of the computer without having to reboot the computer between the configuring and the reconfiguring.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 9 is a block diagram depicting an exemplary embodiment of a bank allocation.

DETAILED DESCRIPTION

Figure 1:
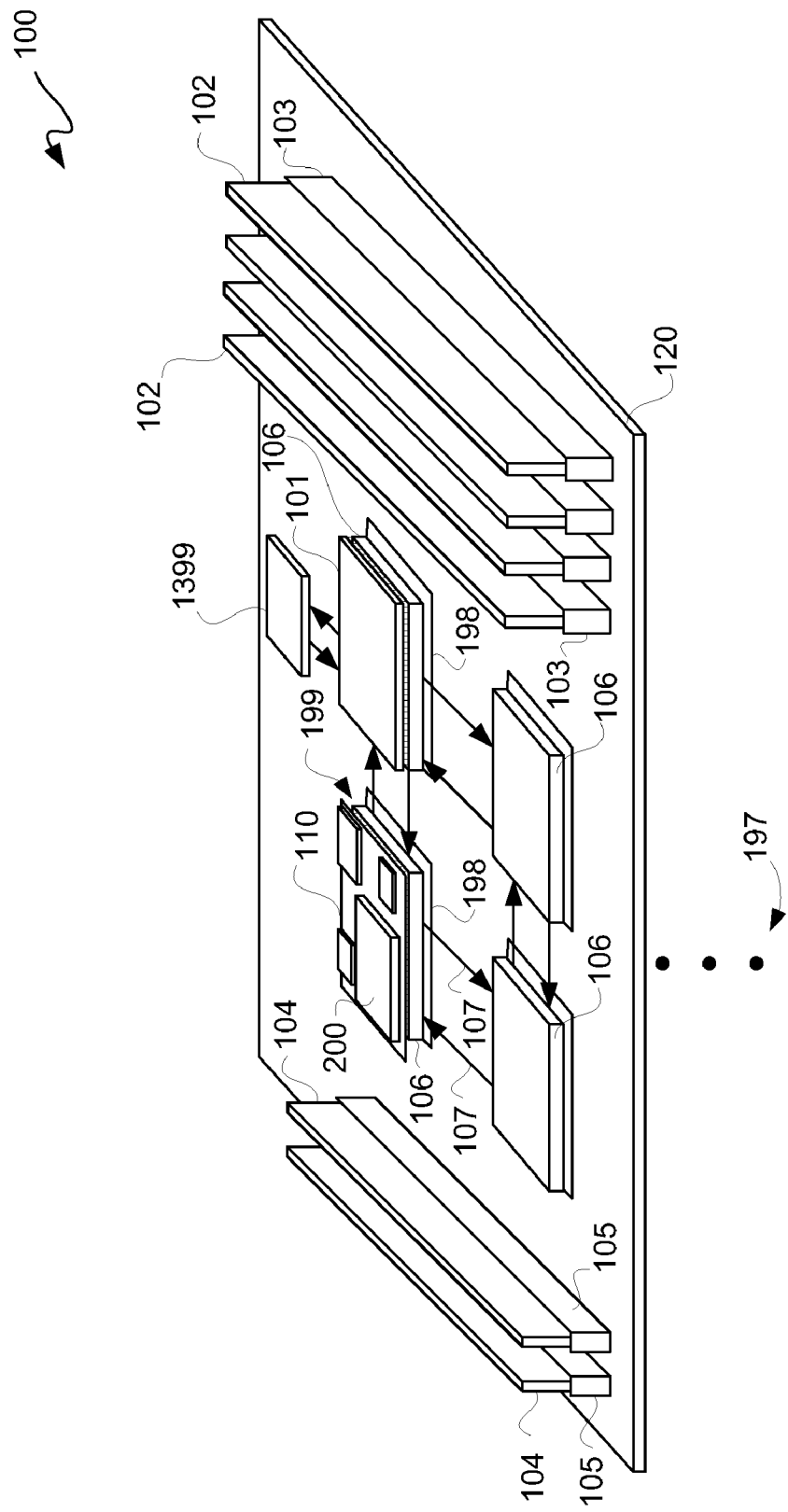
FIG. 1 is a perspective view block diagram depicting an exemplary embodiment of a multiprocessor-capable computing system.

In the following description, numerous specific details are set forth to provide a more thorough description of the specific embodiments. It should be apparent, however, to one skilled in the art, that the invention may be practiced without all the specific details given below. In other instances, well known features have not been described in detail so as not to obscure the embodiments. For ease of illustration, the same number labels are used in different diagrams to refer to the same items; however, in alternative embodiments the items may be different.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following description, it should be appreciated that throughout the description, terms such as "processing" or "computing" or "calculating" or "determining" or "displaying" or the like refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present system and methods also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

For purposes of clarity by way of example and not limitation, an HT link is described even though it shall be apparent from such description that other types of microprocessor interfaces may be used. An HT link is a packet-based input/output ("I/O") link which may be implemented using two unidirectional sets of signals. The HT link, which nominally is a point-to-point bus architecture, may be used to couple a microprocessor to an accelerator module. Basically, one set of signals from one HT capable device to another includes a clock signal, a control signal, and a set of command address and data ("CAD") signals. Control signaling ("CTL") is used to differentiate between control signaling and data signaling of CAD. In an HT link, each byte of CAD has a control signal. A clock signal is used for both CAD and CTL signals. Each byte of CAD, and its associated CTL, has a separate clock signal.

An accelerator module as described herein is referred to as a reconfigurable processor unit ("RPU"). An RPU may be coupled to a motherboard as a stand alone processor, namely without a separate microprocessor coupled to the same motherboard or without a separate microprocessor coupled to a related motherboard, such as in a blade system. For example, an FPGA included with the RPU may have an embedded processor or may have a soft processor instantiated in configurable logic. However, at least one microprocessor is described as being coupled to a same motherboard for purposes of clarity by way of example and not limitation. As described herein, an RPU may have one or more HT links, which facilitates a scalable HT fabric.

FIG. 1 is a perspective view block diagram depicting an exemplary embodiment of a multiprocessor-capable computing system 100. Computing system 100 includes a motherboard 120. Coupled to motherboard 120 may be one or more dynamic random access memory ("DRAM") modules ("module memory") 104 coupled to motherboard 120 via associated edge connectors 105, such as to provide system memory. Additionally, motherboard 120 may include one or more peripheral cards 102 coupled via associated edge connectors 103.

Motherboard 120 may include one or more microprocessor sockets 106, which are interconnect-compatible with microprocessor 101. Two of the four sockets 106 illustratively shown do not have any device plugged into them. A microprocessor socket 106 includes an array of holes (not shown for purposes of clarity) which is to be mated with the pin grid array ("PGA") of a microprocessor 101. A variety of different PGAs may fit into a variety of sockets. Alternatively, what is known as a Land Grid Array ("LGA") may be used. Furthermore, it is not necessary that a microprocessor 101 be coupled to motherboard 120 via a socket 106, as microprocessor 101 may be mounted to motherboard 120, by flow or wave soldering, or other methods of attaching an integrated circuit chip to a circuit board.

Likewise, RPU 110 may be coupled to motherboard 120 by a microprocessor socket 106 configured for a PGA or LGA, or more directly coupled to motherboard 120 such as by soldering for example. However, for purposes of clarity by way of example and not limitation, it shall be assumed that RPU 110 and microprocessor 101 are both coupled to motherboard 120 via respective sockets 106. Even though in the example four sockets 106 are shown for possibly receiving at least one and as many as four RPUs 110, it should be appreciated that fewer or more microprocessor physical interfaces ("microprocessor interfaces") 198 may be present. Each socket 106 of motherboard 120 may have an instance of an RPU 110 plugged into it. In other words, motherboard 120 need not have any microprocessor 101 plugged into any of its microprocessor sockets 106. Furthermore, as illustratively shown in FIG. 1, a South Bridge chip ("South Bridge") 1399 may be coupled to microprocessor 101.

For purposes of clarity by way of example and not limitation, it shall be assumed that microprocessor 101 is an Opteron microprocessor available from Advanced Micro Devices ("AMD"). However, it shall be appreciated that any of a variety of other types of microprocessors including other microprocessors available from AMD, as well as microprocessors available from Intel, and ARM, among other microprocessor manufacturers, may be used. Some microprocessor bus architectures are not designed to allow arbitrary devices to be coupled to them for direct communication with the microprocessor. Instead, a bridging device, which is part of the microprocessor chipset, may be used to convert the microprocessor bus or "front side bus" into a standard bus to which other devices may be attached.

However, in general, fabric of a microprocessor interface may be expanded beyond merely using general-purpose microprocessors. As an Opteron application is described herein, by directly communicating or direct communication, including variations thereof, it is generally meant that a bridge or other intermediary device need not be used for communicating with a microprocessor via a microprocessor interface. Motherboard 120 may include many known components which are omitted here for purposes of clarity and not limitation. In this example, motherboard 120 may be a K8SRE(S2891) motherboard from Tyan Computer Corporation; however, many other motherboards may be used from this or other vendors.

Thus, for example, a high performance computing or server system ("computing system") may be built with multiple motherboards, as generally indicated by dots 197, connected by high-speed buses of a back plane (not shown). In such computing systems, one or more of such motherboards 120 may have one or more RPUs 110 without any microprocessor 101. Furthermore, in such systems other motherboards 120 may have one or more microprocessors 101 without any RPUs 110. Alternatively or additionally, in such systems, one or more other motherboards 120 may have a combination of one or more RPUs 110 and one or more microprocessors 101. Again, for purposes of clarity by way of example and not limitation, a microprocessor 101 of a computing system 100 with a single motherboard 120 is described, as any of the other configurations described shall be understood from the description herein of a computing system 100 with a single motherboard 120.

From the following description, it will be appreciated that no modification to motherboard 120 need be made in order to accommodate RPU 110. Thus, RPU 110 may be directly inserted into a microprocessor socket 106 of motherboard 120. For purposes of clarity and not limitation, it shall be assumed that a microprocessor interface for Opteron microprocessors, namely a 940 pin PGA socket defined by AMD, is used. This socket is commonly referred to as a "940 socket", and again is used by way of example and not limitation, as any of a variety of types of microprocessor interfaces available from AMD and other vendors may be used. RPU 110 may access system memory, such as module memory 104 via a microprocessor interface 198 associated with microprocessor socket 106. By providing direct communication between RPU 110 and microprocessor 101, as well as system memory, via a microprocessor interface 198, data rates may be increased over conventional levels. Latency bottlenecks may be at least substantially reduced by having RPU 110 carry out the execution of all or portions of applications, such as complex or specialized algorithms for example, in programmed programmable logic.

Application acceleration may be obtained by off-loading central processing unit ("CPU")-intensive or specialized software subroutines, or a combination thereof, to RPU 110. RPU 110 may be dynamically tailored to perform execution of instructions associated with such CPU intensive or specialized software subroutines. Thus, one or more applications, rather than being executed in software, are executed at least in part in hardware, namely programmable logic programmed to execute all or a portion of a set of instructions. By executing such instructions in hardware, such applications may be substantially accelerated as compared with executing them in software using a general-purpose microprocessor.

RPU 110 may be configured to be a special-purpose processor or co-processor, which may be tailored to an application. Moreover, because RPU 110 may be reconfigured for any of a variety of applications, a reconfigurable application-specific computing environment is provided, which may be more economical than providing an application-specific computing environment which is not reconfigurable. Additionally, because of enhanced data rates and substantially reduced latency associated with a microprocessor interface, as compared with for example a peripheral bus, the ability to configure FPGA 200 of RPU 110 in a substantially reduced amount of time, as well as the ability to move data at higher bandwidths with reduced latency, allows for significant performance advantages. Although RPU 110 may be used to provide significant performance benefits in CPU-intensive applications, such as computer modeling, computer simulation, computer rendering, computer synthesis, database searching/sequencing, database sorting, cryptographic encoding/decoding, and data compressing/decompressing, among other CPU-intensive applications, it should be appreciated that RPU 110 is not limited to CPU-intensive applications.

HT links 107, as generally indicated by arrows, provide electrical continuity within motherboard 120 for an HT interface for communicating with microprocessor 110. Even though a rectangular pattern for interconnecting microprocessor sockets 106 is illustratively shown, it should be appreciated that other configurations of HT links 107, including diagonal, may be used. Use of microprocessor sockets 106 allows microprocessors 101 as well as RPUs 110 to be relatively easily removed or added to a computing system 100. Accordingly, it should be appreciated that system 100 need not be static in this regard. Thus, if an application is more dependent upon RPUs 110 than microprocessors 101, microprocessors 101 may be exchanged for RPUs 110, and vice versa.

Because motherboards 120 may be manufactured in large quantities to support more general-purpose computing needs, the ability to socket RPU 110 to a conventional motherboard 120 without having to alter the configuration of motherboard 120 facilitates deployment of RPUs in a variety of existing computing systems. Use of RPU 110 in some existing systems may involve some minor changes. For example, Basic Input/Output System ("BIOS") changes or other programming changes may be involved. Furthermore, physical changes, such as by setting dip switches for example, may be involved. However, by using microprocessor interfaces which are common in computer systems, the number of these minor changes may be reduced. Thus, having an RPU 110 which is compatible with a common microprocessor interface leverages the ability of migrating RPUs 110 to servers and workstations.

The mechanical and electrical properties associated with at least a portion of connection locations of a PGA of microprocessor 101 for interfacing to an HT link 107 may be the same as those for RPU 110. However, RPU 110 need not use all the connections available to a microprocessor interface via microprocessor socket 106, as RPU 110 may use substantially less than all of the connections available via microprocessor socket 106. Alternatively, as described below in additional detail, nearly all of the available pin locations of a microprocessor socket 106 may be used.

Figure 2:
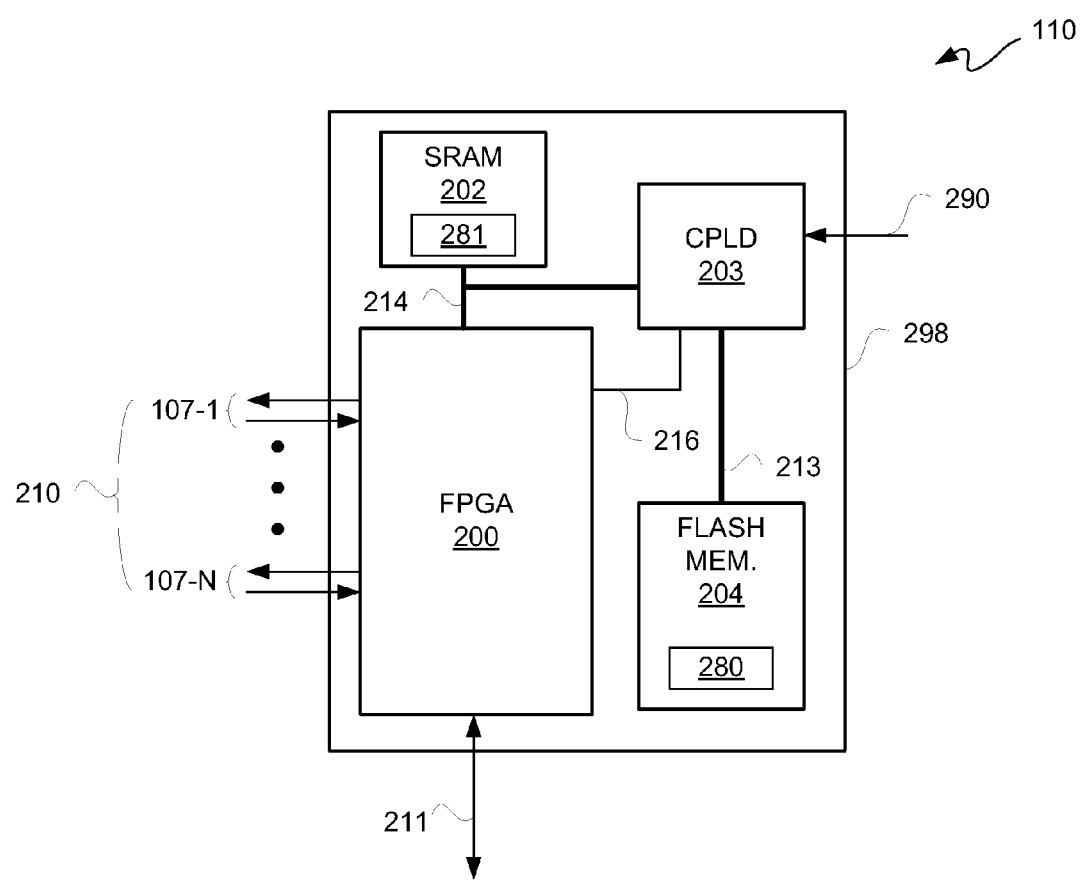
FIG. 2 is a block diagram depicting an exemplary embodiment of a reconfigurable processor unit ("RPU").

Referring now to FIG. 2, there is shown a block diagram depicting an exemplary embodiment of an RPU 110. RPU 110 includes FPGA 200, nonvolatile memory 204, and high-speed memory 202, as well as a controller 203. More particularly for this exemplary embodiment, nonvolatile memory 204 may be flash memory. Furthermore, high-speed memory 202 may be static random access memory ("SRAM") 202, and controller 203 may be a complex programmable logic device ("CPLD") 203. However, it should be appreciated from the following description that, these particular types of components may be changed. For example, an Application Specific Integrated Circuit ("ASIC") may replace CPLD 203. Likewise, read-only memory ("ROM") may replace flash memory 204. Finally, depending on the speed at which high-speed memory 202 is to be accessed, random access memories having slower speeds than SRAM 202 may be used, such as some forms of dynamic random access memory ("DRAM"), including reduced latency DRAM ("RLDRAM").

FPGA 200 may in an embodiment be an XC4VLX60FF668 available from Xilinx, Inc. Moreover, CPLD 203 may be an XC2C384-7FT256 CPLD also available from Xilinx, Inc. FPGA 200 and CPLD 203 may both be obtained from Xilinx, Inc., where FPGA 200 and CPLD 203 have interfaces designed for connecting to one another. The part numbers above are merely examples of parts that may be used; it should be appreciated that other integrated circuits for each of the above-described chips may be used. Moreover, other FPGAs or CPLDs, including those available from Xilinx as well as other vendors, may be used. Other components of RPU 110, such as resistors, capacitors, buffers, and oscillators, among others, have been omitted for purposes of clarity and not limitation.

With renewed reference to FIG. 1, and continuing reference to FIG. 2, computing system 100 and RPU 110 are further described. SRAM 202, FPGA 200, flash memory 204, and CPLD 203 are coupled to a printed circuit board ("PCB") 298. The under-side of PCB 298 may have extending therefrom pins 199 for plugging into a microprocessor socket 106.

HT links 107 may be directly coupled with pins 199 for direct communication with pins of FPGA 200 via PCB 298.

However, SRAM 202 and flash memory 204 are not coupled to a microprocessor interface 198 associated with microprocessor socket 106, and CPLD 203 is generally not coupled to microprocessor interface 198 other than the coupling to microprocessor interface 198 for a small number of control signals. SRAM 202 may be used as an alternate storage for configuration information or as a memory resource for an application being executed by RPU 110, or a combination thereof. However, resources other than SRAM 202 may be used for either or both of these purposes, and thus SRAM 202 may be optional. Internal SRAM of FPGA 200 may be used, where FPGA 200 is configured internally via an Internal Configuration Access Port ("ICAP").

FPGA 200 of RPU 110 may be put in direct communication with microprocessor 101 via an HT link 107. There may be more than one HT link 107, as generally indicated by HT links 107-1 through 107-N, for N a positive integer greater than one (collectively herein HT links 107). For example, N may be equal to 3, where each HT link 107 represents a 16-bit wide bus. Collectively, HT links 107 may be considered a microprocessor bus 210.

FPGA 200 may be directly coupled to HT links 107, and thus is in direct communication with multiple HT-compatible devices, such as one or more other RPUs or one or more microprocessors, or a combination thereof. Thus, FPGA 200 may be configured to communicate with multiple HT link-compatible devices directly via HT links 107.

RPU 110 may appear as a non-coherent bus device to microprocessor 101. For example, RPU 110 may appear as a PCI device to microprocessor 101. However, in contrast to a PCI device, RPU 110 communicates directly via HT links 107 with microprocessor 101. Alternatively, another non-coherent bus device interface, such as RapidIO, HyperTransport, or PCI Express for example, may be used instead of PCI. Thus, software, or more particularly Application Program Interfaces ("APIs"), written for PCI may be migrated to RPU 110. As described below in additional detail, this means that source code, written for example in a high-level programming language such as C, for a PCI may be directly converted to a hardware description language ("HDL") version thereof for instantiation in programmable logic fabric of FPGA 200 of RPU 110. However, RPU 110, while appearing as a non-coherent bus device to microprocessor 101 for purposes of facilitating rapid deployment, need not appear as a non-coherent bus device. Accordingly, it should be understood that RPU 110 may be configured to appear as a coherent bus device to microprocessor 101.

FPGA 200 may be coupled for communication with module memory 104, as generally indicated by memory bus 211. Continuing the above-described example of an AMD Opteron motherboard, AMD 64's Direct Connect Architecture may be used by RPU 110 not only for directly communicating with module memory 104, but additionally for memory mapping a portion of such module memory 104 to RPU 110 as a primary user thereof. In other words, each microprocessor socket 106 may be associated with a bank of DRAM memory of module memory 104. For an RPU 110 that is plugged into a socket 106, the portion of module memory 104 associated with that socket becomes dedicated to such RPU 110. Thus, RPU 110 is capable of directly communicating with such dedicated memory portion thereto of module memory 104, namely without having to pass through intermediate chips for bridging or arbitrated busing. This dedicated portion of module memory 104 may be used for accelerating an application or portion thereof being executed by such an RPU 110, as this dedicated portion of memory provides a substantially high bandwidth and a substantially low latency. In addition, memory of module memory 104 associated with other of sockets 106 may be accessed by means of one or more HT links 107 and one or more microprocessors 101. For these accesses to non-dedicated memory, RPU 110 does not do any arbitration; rather, such accesses may for example be arbitrated by a memory controller forming part of microprocessor 101.

FPGA 200 is coupled in this example through microprocessor socket 106 to HT links 107 and AMD 64's Direct Connect Architect for coupling for example to a module of module memory 104 via memory bus 211. Again, it should be appreciated that performance may be enhanced by improved throughput and reduced latency when communicating information to and from RPU 110 via memory bus 211.

PCB 298 may include an SRAM bus 214, a CPLD/FPGA bus 216, and a flash memory bus 213. CPLD 203 provides means for communicating a default configuration from flash memory 204 for FPGA 200. This default configuration obtained from flash memory 204 is provided to CPLD 203 via flash memory bus 213.

Figure 3:
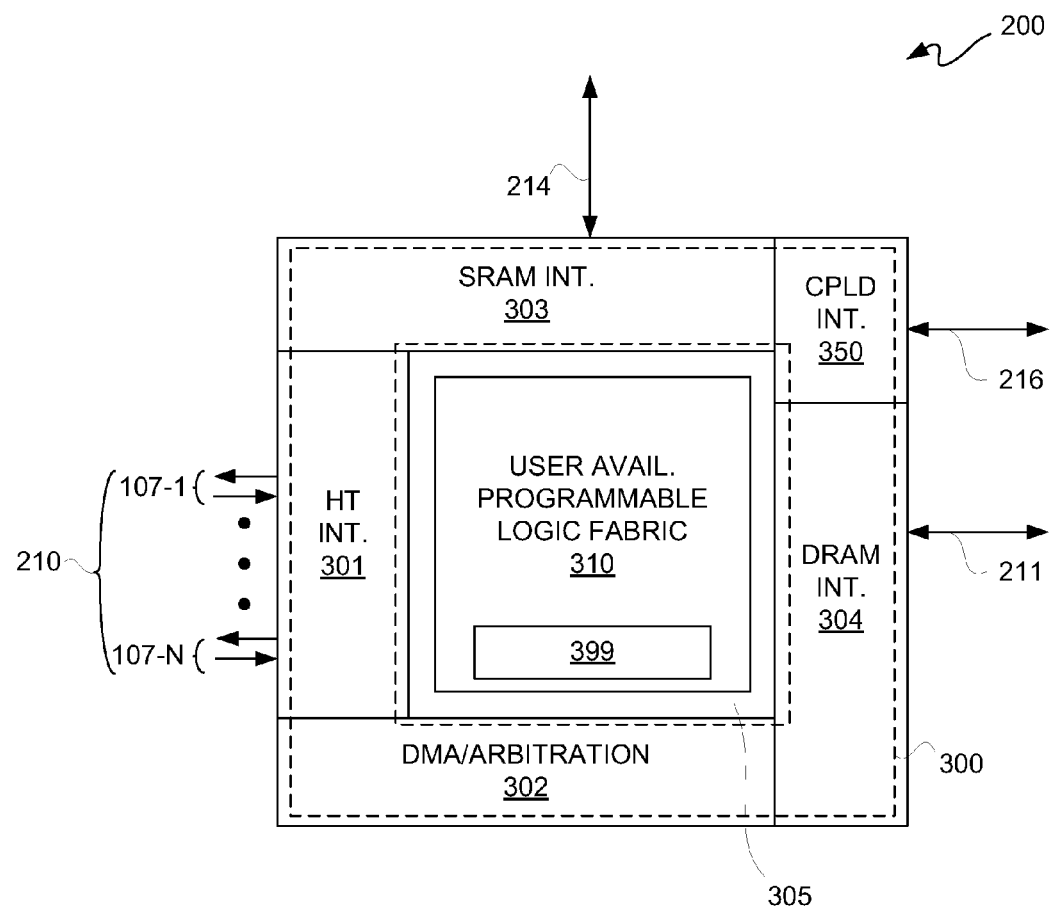
FIG. 3 is a block diagram depicting an exemplary embodiment of some of the functional blocks of the Field Programmable Gate Array ("FPGA") of the RPU of FIG. 2.

FIG. 3 is a block diagram depicting an exemplary embodiment of some of the functional blocks of FPGA 200 after a configuration thereof. FPGA 200 may have instantiated in programmable logic thereof a bitstream derived from a CPLD interface core to provide CPLD interface 350. Additionally, other core-derived bitstreams may be instantiated in programmable logic of FPGA 200, such as via CPLD/FPGA bus 216, to provide support functions in addition to CPLD interface 350, as described below in additional detail. For example, an HT core-derived bitstream may be instantiated in FPGA 200 to provide HT interface 301 for communicating with one or more HT links 107. Additionally, a core-derived bitstream may be instantiated in FPGA 200 to provide arbitration block 302 for addressing and arbitrating communications with non-dedicated portions of module memory 104 via one or more HT links 107 and one or more microprocessors 101. Portions of module memory 104 may be considered "system memory" as they are dedicated to one or more microprocessors 101. Arbitration block 302 may be configured to support Direct Memory Access ("DMA"). A core-derived bitstream may be instantiated in FPGA 200 to provide SRAM interface 303 for communicating with SRAM 202. Data may be communicated to and from SRAM interface 303 or user design 399 for example via one or more HT links 107 as arbitrated by DMA/arbitration block 302. Furthermore, rather than SRAM 202, RLDRAM may be used, in which embodiment an RLDRAM interface 303 may be instantiated in programmable logic of FPGA 200. A portion of SRAM bus 214 may be shared by CPLD 203 and FPGA 200 for communicating with SRAM 202 A core-derived bitstream may be instantiated in FPGA 200 for providing DRAM interface 304 for communicating with a dedicated portion or non-system memory portion of module memory 104 via memory bus 211.

HT interface 301, DRAM interface 304, SRAM interface 303, DMA/arbitration block 302, and CPLD interface 350 (hereinafter collectively "support functions 300") may be coupled to user available programmable logic fabric 310 via wrapper interface 305. Wrapper interface 305 may be configured to provide a substantially consistent interface coupling one or more of support functions 300 to user available programmable logic fabric 310. For example, suppose one or more of support functions 300 are to be added or modified; while such modifications to support functions 300 likely will involve reconfiguration of user available programmable logic fabric 310 for instantiation of a user design 399 therein, such modifications are unlikely to result in having to modify the interface of user design 399. Thus, by providing a consistent wrapper interface, effort associated with having to modify user design 399 may be avoided.

The physical size of RPU 110, including physical configuration of PCB 298, may be limited with respect to physical configuration of a microprocessor and heat sink combination to avoid neighboring components of motherboard 120. For example, by limiting the physical size of RPU 110 to the volume conventionally used by an Opteron heat sink, deployment of RPU 110 is facilitated. More particularly, AMD has defined the length, width, height, and mounting hardware for such a heat sink and motherboard manufacturers adhere to this specification to ensure their motherboard is compatible with third party heat sinks.

Figure 4:
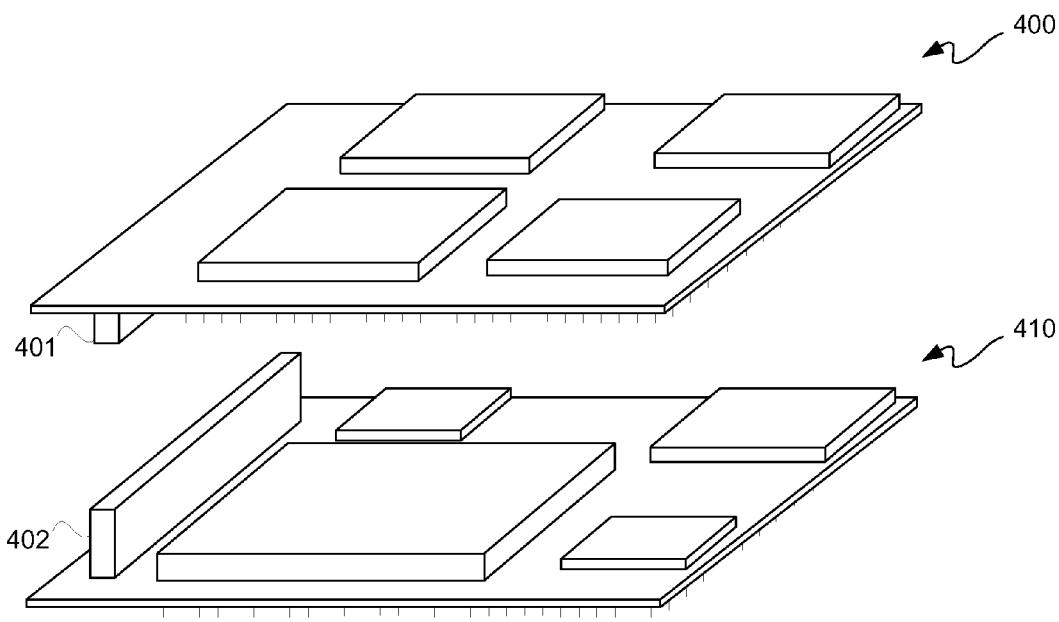
FIG. 4 is a perspective view depicting an exemplary alternative embodiment to the RPU of FIG. 2, namely with an additional connector.

FIG. 4 is a perspective view depicting an exemplary alternative embodiment to RPU 110, namely RPU 410. RPU 410 is generally the same as RPU 110 other than an additional connector 402 is included. Connector 402 may be mated with connector 401 of daughter card 400. Daughter card 400 may include one or more additional chips for expanding functionality of RPU 410. For example, such additional functionality may include one or more of additional memory or additional HT links. Examples of additional memory may include flash, SRAM, DRAM, and ROM, among other types of memory.

Figure 5:
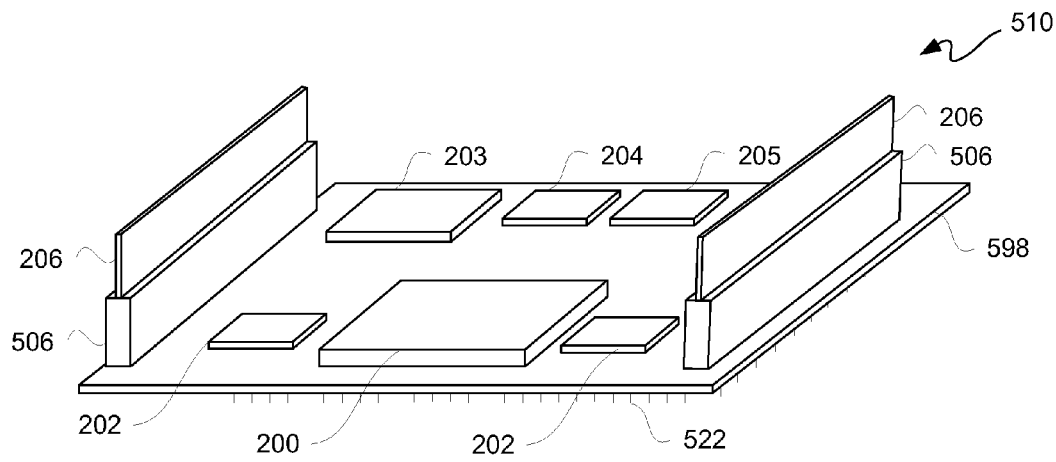
FIG. 5 is a perspective view block diagram depicting another exemplary embodiment of an RPU.

FIG. 5 is a perspective view block diagram depicting an exemplary embodiment of an RPU 510. RPU 510, like RPU 110 of both FIGS. 1 and 2, includes FPGA 200, nonvolatile memory 204, high-speed memory 202, and CPLD 203. PCB 598 of RPU 510 has more pins 522 than PCB 298. For this example, FPGA 200 may be an XC4VLX200-11FF1513C available from Xilinx, Inc. RPU 510 further includes sockets 506 for receiving respective DRAM modules 206. Additional RAM 205, which may be RLDRAM, may be included as part of RPU 510. Like the description of RPU 110, other support components for RPU 510 are not described for purposes of clarity and not limitation.

By having RPU-on-board DRAM modules 206, memory I/O constraints are reduced, as memory bandwidth is increased. Thus, by using RPU 510, CPU constrained processes can be accelerated. Such processes may be further accelerated by lifting memory I/O constraints associated with accessing module memory 104 of motherboard 120 of computer system 100 of FIG. 1. By having DRAM modules 206 more closely coupled with FPGA 200 than, for example, module memory 104, access performance of memory with reference to modules 206 may be enhanced.

FPGA 200 may communicate with DRAM modules 206 via DRAM interface 304 of FIG. 3. Any of a variety of types of DRAM may be used, such as DDR DRAM and RLDRAM for example. The number of pins 522 used for RPU 510 for coupling to microprocessor socket 106 of motherboard 120 of FIG. 1 may be substantially greater than that of RPU 110. The higher pin count allows for one or more additional HT links 107 and additional functionality of DRAM interface 304, as well as some additional control and monitoring signals.

Figure 6:
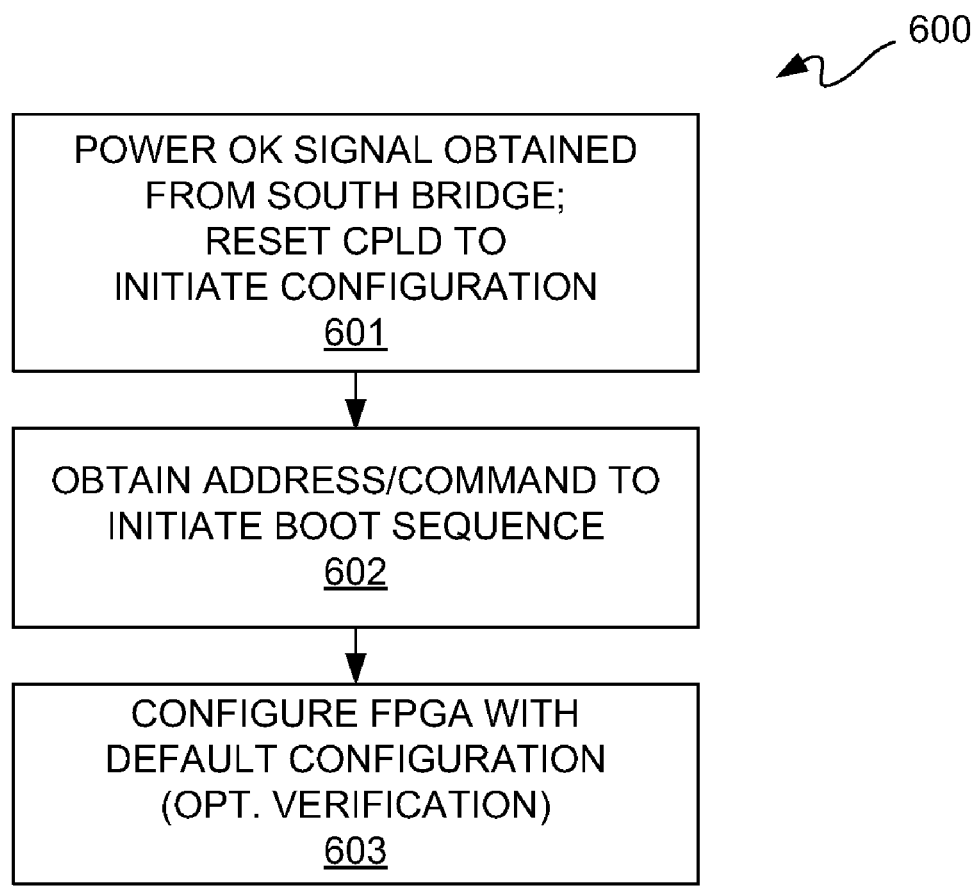
FIG. 6 is a flow diagram depicting an exemplary embodiment of a boot flow for the RPUs of FIGS. 2, 5, and 10.
Figure 10:
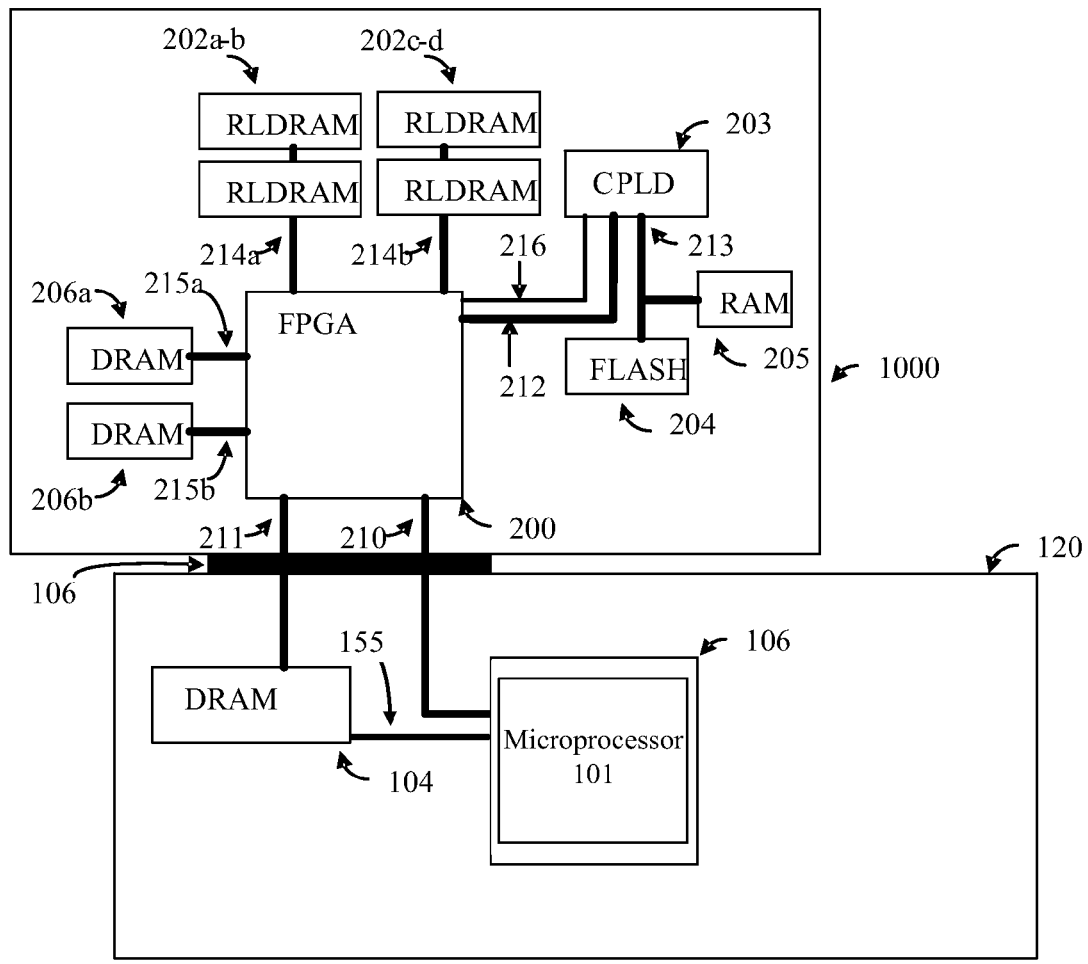
FIG. 10 is a block diagram depicting yet another exemplary embodiment of an RPU.

FIG. 6 is a flow diagram depicting an exemplary embodiment of a boot flow 600 for RPU 110 of FIG. 2, RPU 510 of FIG. 5, or RPU 1000 of FIG. 10. With renewed reference to FIGS. 1 through 5 and 10, as well as continuing reference to FIG. 6, boot flow 600 is further described.

At 601, a power acceptable ("OK") signal is obtained for example from South Bridge 1399. This may be a signal which transitions from a logic low to a logic high state to indicate that acceptable power levels have been obtained. The power OK signal, such as power OK signal 290, is provided to CPLD 203 as illustratively shown in FIG. 2. Responsive to power OK signal 290 being in a logic high state, CPLD 203 is reset at 601 to initiate RPU 110 or RPU 510 configuration. Alternatively, CPLD 203 may have logic that recognizes when power is first applied and may then configure FPGA 200 automatically with a default configuration from flash memory 204 without waiting for a power OK signal 290 to be asserted.

Accordingly, when power is initially supplied or a microprocessor reset signal is applied, FPGA 200 may be configured with a default configuration automatically from flash memory 204. Additionally, FPGA 200 may be configured with a default configuration automatically from flash memory 204 if FPGA 200, or more generally RPU 110 or RPU 510, ceases to properly operate due to any of a variety of conditions or otherwise exceeds an environmental operating threshold. Monitor logic is built into FPGA 200 and CPLD 203 which checks for correct operation of FPGA 200. Monitor logic may be used to initiate reconfiguring with a default configuration if FPGA 200 or CPLD 203 senses a fault condition.

At 602, from an address of flash memory 204, which for example may be referred to as address 0, a boot sequence is initiated. Additionally, a CPLD bitstream select input, which may be coupled via a pin associated with microprocessor socket 106 or microprocessor interface 198, may additionally be used. This bitstream select pin (not shown) may be used to cause CPLD 203 to load an alternative configuration bitstream out of flash memory 204. This alternative configuration bitstream may start at a different address than the start address of the boot sequence so as to avoid confusion with a primary default configuration bitstream. The alternative default configuration bitstream may be used for example in the event that the primary default configuration bitstream becomes corrupted or for providing an alternative default configuration for FPGA 200.

Flash memory bus 213 is used to write and read information to and from flash memory 204 under control of CPLD 203. CPLD 203 via flash memory bus 213 may be used to read a configuration bitstream for providing to a select map interface of FPGA 200 via SRAM bus 214. Alternatively or additionally, a dedicated configuration bus 212 may be used for configuration and other communication between FPGA 200 and CPLD 203. A configuration bitstream may thus be provided from flash memory 204 to CPLD 203 and then to a select map port of FPGA 200 via a dedicated configuration bus 212 of FIG. 10. Additionally, there may be dedicated configuration RAM 205 of FIG. 10 connected in parallel with flash memory 204. Functions of reconfiguration and user memory are not shared by the same SRAM device in RPU 510.

Asynchronous flash reads may be relatively slow in comparison to communication between SRAM 202 and SRAM interface 303 via SRAM bus 214. Reconfiguration, which in contrast to an initial or start-up default configuration, may be more time sensitive for supporting ongoing operations, for example real-time processing. Accordingly, one or more reconfiguration bitstreams 281 may be loaded into SRAM 202 from memory accessible via motherboard 120. Alternatively, reconfiguration may be done from flash memory 204, and thus the one or more configuration bitstreams 280 stored in flash memory 204 may include one or more reconfiguration bitstreams. Again, flash memory 204 may be accessed via CPLD 203 for writing information thereto, although this may be done at a slower rate as compared to writing to SRAM 202.

At 603, FPGA 200 is configured with a default configuration. This default configuration pattern is sufficient to operate HT interface 301. This means that microprocessor 101 may recognize FPGA 200 for communication via one or more HT links 107. HT interface 301 may then be used to transfer data to flash memory 204 under control of CPLD 203. Flash memory 204 may contain a default FPGA configuration bitstream 280 for instantiation in programmable logic of support functions 300. Thus, such default configuration bitstream 280 may be sufficient to operate HT interface 301, as well as one or more of SRAM interface 303, DRAM interface 304, or DMA/arbitration block 302.

As previously described, CPLD 203 initially configures FPGA 200 using the select map port of FPGA 200 (not shown for FPGA 200). Flash memory 204 and CPLD 203 may be initially loaded with a default configuration before being soldered onto or otherwise coupled to PCB 298 of RPU 110 or PCB 598 of RPU 510. Flash memory 204 may be reloaded while FPGA 200 is operating by transferring new or additional configuration data over HT interface 301. However, flash memory 204 generally provides semi-permanent storage for a default FPGA configuration bitstream which is generally changed infrequently. Furthermore, CPLD 203 provides basic support functions for RPU 110 or RPU 510 and likewise is generally changed infrequently.

Optionally, for purposes of verification, blocks of data stored in flash memory 204 read out by CPLD 203 may be compared against supposedly equivalent blocks of data loaded into SRAM 202. Thus, SRAM 202 may be used as a buffer to load in what should be an equivalent configuration or reconfiguration bitstream for comparison with a configuration or reconfiguration bitstream in flash memory 204. Furthermore, SRAM 202 may be used as buffer memory for loading a configuration or reconfiguration bitstream into flash memory 204 under control of CPLD 203.

SRAM 202 may be read from or written to under control of CPLD 203. This may be at a lower speed than with respect to communication with FPGA 200 via SRAM interface 303. However, for a runtime reconfiguration of FPGA 200, SRAM 202 may be loaded with a reconfiguration bitstream from an HT link 107. FPGA 200 may then inform CPLD 203 to initiate a reconfiguration from a configuration bitstream in SRAM 202. By at runtime, it is generally meant an operation or sequence of operations that takes place after normal operation has been initiated and such operation or sequence of operations is performed during normal operation, such as of FPGA 200 and microprocessor 101, where normal operations are resumed after such operation or sequence of operations without having to reboot.

For a CPLD-FPGA Xilinx pair, there may be a dedicated set of signals for configuration and communication between CPLD 203 and FPGA 200. These signals include the capability to transfer data and addresses to and from FPGA 200 and CPLD 203 to allow FPGA 200 to indicate to CPLD 203 when a configuration cycle has completed, and to pass a power OK signal 290 to FPGA 200, among other operations consistent with the description herein. Moreover, CPLD 203 may include an address register and a configuration register in accordance with the description herein.

Figure 7:
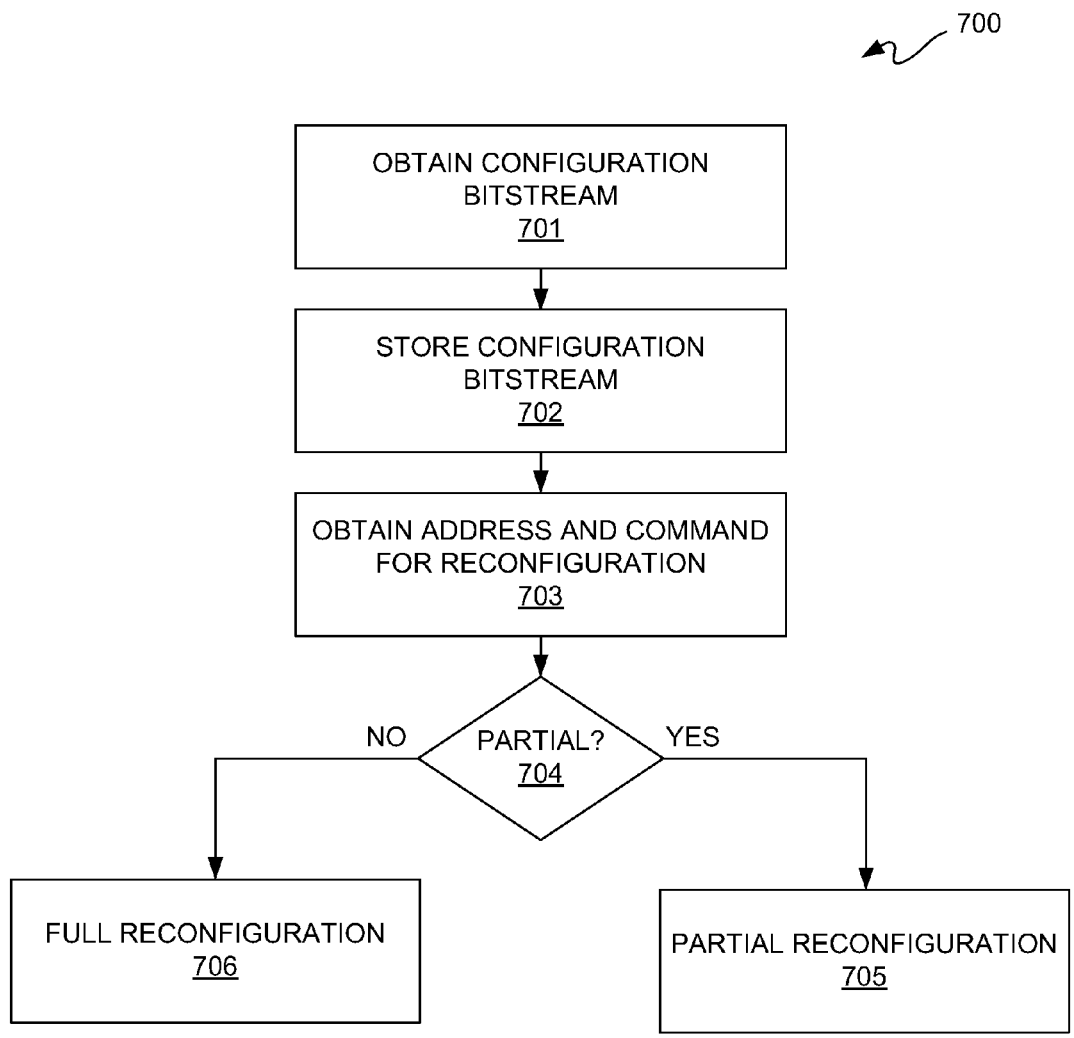
FIG. 7 is a flow diagram depicting an exemplary embodiment of a configuration flow.

FIG. 7 is a flow diagram depicting an exemplary embodiment of a configuration flow 700. Configuration flow 700 is described with continuing reference to FIG. 7 and with renewed reference to FIGS. 1 through 5. At 701, microprocessor 101 transfers or causes transfer of a configuration bitstream over HT bus 210 for writing to FPGA 200 of RPU 110 or RPU 510. This configuration bitstream may include a user design 399 for instantiation in user available programmable logic fabric 310. Additionally or alternatively, this configuration bitstream may include additional or revised definitions for one or more of support functions 300.

At 702, FPGA 200 saves the configuration bitstream obtained at 701. The configuration bitstream obtained may be saved for example in on-board SRAM or DRAM, such as using memory interfaces 303 or 304, respectively. If, however, full reconfiguration of FPGA 200 is to be performed, the configuration bitstream is generally saved in SRAM 202 as configuration bitstream 281. For full reconfiguration, configuration data may be lost when DRAM interface 304 ceases to operate during the configuration process. SRAM 202 may be controlled using CPLD 203 instead of SRAM interface 303 in FPGA 200, so configuration data is retained while FPGA 200 is being reprogrammed with configuration bitstream 281. Once SRAM interface 303 is instantiated in FPGA 200 responsive to reconfiguration, optionally control may be transferred from CPLD 203 to SRAM interface 303 to speed up reconfiguration.

Operations at 701 and 702 may overlap one another for concurrently obtaining a configuration bitstream and then saving the configuration bitstream as it is being obtained. This may save time, in particular when fully configuring FPGA 200 as the amount of configuration data may be substantial. For partial reconfiguration, less time may be saved by having operations at 701 and 702 overlap one another.

At step 703, microprocessor 101 uses HT bus 210 to send FPGA 200 the starting address of the configuration bitstream stored in memory at 702. Additionally at 703, microprocessor 101 sends a command to FPGA 200 of RPU 110 or RPU 510 to reconfigure itself. This command indicates whether to perform a partial reconfiguration or a full reconfiguration. At 704, this command may be interpreted by FPGA 200 as to whether partial or full reconfiguration is to be performed for initiating the reconfiguration.

If partial reconfiguration is determined at 704, then at 705 one or more support functions 300 may remain active, for example when configuration data transferred over HT bus 210 to FPGA 200 is only to configure or reconfigure a user design in user available programmable logic fabric 310. This is interpreted as a partial reconfiguration, which consumes significantly less time than a full reconfiguration. Data for partial reconfiguration may be saved in SRAM 202 or in DRAM, such as DRAM of memory module 104 or DRAM 206. Optionally, a configuration bitstream may be stored in internal RAM of FPGA 200 when doing partial reconfiguration. Since FPGA 200 is not completely erased and continues to operate during partial reconfiguration, downloading and reconfiguration may proceed in parallel. Additionally, modifications to one or more of support functions 300 other than HT interface 301 may be considered for partial reconfiguration depending on one or more of the application and the extent of the modifications.

When RPU 110 or RPU 510 is used to accelerate computational algorithms, frequent reconfiguration may be involved, and thus reconfiguration time becomes a limiting factor in determining the amount of acceleration that may be obtained. Accordingly, partial reconfiguration may be used for such applications.

Partial reconfiguration at 705 may involve FPGA 200 loading a partial reconfiguration bitstream into internal memory of FPGA 200 for reconfiguration using an ICAP (not shown) for FPGA 200. Thus, dedicated hardware resources of FPGA 200 may be used for reading and passing such partial reconfiguration bitstream to program configuration memory associated with user available programmable logic fabric 310 to partially reconfigure or instantiate a user design 399. After loading of reconfiguration data is complete, new or revised logic functions specified by the partial reconfiguration data become active and may be used.

If full reconfiguration is determined at 704, then at 706 CPLD 203 takes over control of SRAM 202 and erases programmable logic RAM of FPGA 200. After which, CPLD 203 transfers or causes the transfer of a full set of reconfiguration data to FPGA 200. This is similar to boot flow 600 of FIG. 6, except that the reconfiguration data comes from SRAM 202 under control of CPLD 203 instead of coming from flash memory 204. Alternatively, a default configuration could be initiated as previously described with reference to boot flow 600 of FIG. 6.

For a user design 399 of FIG. 3 instantiated in programmable logic, whether by full reconfiguration or partial reconfiguration, it should be appreciated that such user design may be used to accelerate execution of an application. For example, microprocessor 101 may hand off to RPU 110 or 510 an algorithm or portion thereof of an application for co-processing by RPU 110 or 510. Thus, a result for co-processing may be output from RPU 110 or 510, as for microprocessor 101, in substantially less time than if the co-processing was done using another microprocessor.

Figure 8:
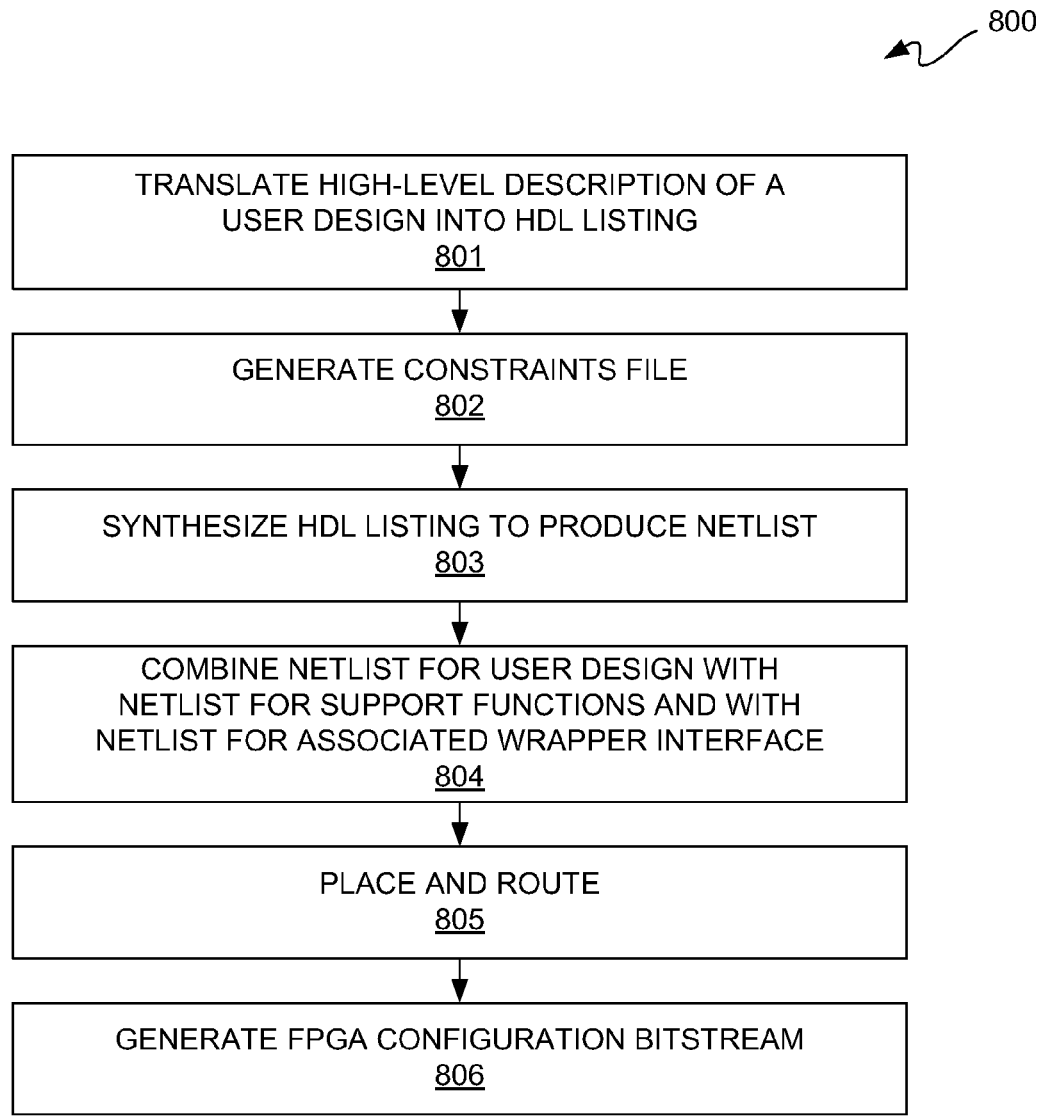
FIG. 8 is a flow diagram depicting an exemplary embodiment of a configuration bitstream generation flow.

FIG. 8 is a flow diagram depicting an exemplary embodiment of a configuration bitstream generation flow 800. A purpose of RPUs as described herein is accelerating computational algorithms. These algorithms are typically described in a high-level computer language, such as C for example. Unfortunately, the C language is designed to execute on a sequential processor, such as for example the Opteron from AMD or the Pentium from Intel.

Using an FPGA-based co-processor directly to execute an algorithm described in the C language would thus offer little or no acceleration since it would not utilize parallelism that may be instantiated in the programmable logic of an FPGA. Advantages of an FPGA-based co-processor as compared to a sequential processor are the degree of parallelism and the amount of memory bandwidth that may be implemented. In order to use FPGA 200 more effectively to accelerate performance, the high-level computer language description of a user's design, such as for a computational algorithm, may be translated into an HDL, such as VHDL or Verilog, listing at 801. Tools are available from companies, such as Celoxica, that do this translation. Additionally, there are variations of the C language, such as for example unified parallel C ("UPC"), in which some parallelism is made visible to the user. A user design in one of such dialects of C may translate into a higher performing design when instantiated in FPGA 200 than the same user design described in the more ubiquitous C language.

At 802, a constraints file is generated for the user design. These constraints include both physical and timing constraints. Physical constraints may be used to ensure that user design 399 to be instantiated in user available programmable logic fabric 310 connects correctly and does not conflict with support functions 300. Timing constraints may be used to estimate the operating speed of user design 399 after instantiation in user available programmable logic fabric 310 and may be used to prevent potential timing problems, such as race conditions for example.

At 803, the HDL listing from 801 is synthesized into a circuit/network listing ("netlist"). Synthesis at 803 converts the user design from an HDL description to a netlist of FPGA primitives. Synthesis at 803 is guided by constraints in the constraints file obtained at 802, such as to at least meet performance targets. The Xilinx tool XST may be used for this synthesis.

At 804, the netlist obtained at 803 for a user design is combined with a netlist for pre-designed support functions 300 and a netlist for associated pre-designed wrapper interface 305. These two netlists for support functions 300 and wrapper interface 305, respectively, may be combined together, and thus are hereinafter collectively referred to as a support functions netlist. The support functions netlist may have a pre-assigned fixed placement in FPGA 200. This pre-assigned fixed placement facilitates combining the support functions netlist with the user design netlist without affecting operation of wrapper interface 305 and support functions 300. Furthermore, sections of the support functions 300 may be substantially sensitive to timing, and correct operation may be promoted by a pre-assigned fixed placement. Optionally the support functions netlist may have a predetermined and fixed routing other than with respect to connecting to the user design.

At 805, the combined netlist obtained at 804 is placed and routed. Placement and routing is performed by the appropriate FPGA software tools. These are available from the FPGA vendor. Constraints in the constraints file generated at 802 guide the placement and routing to ensure that target performance and functionality parameters are met.

At 806, a full or partial configuration bitstream for FPGA 200 is generated. This is performed by a tool supplied by the FPGA vendor. The configuration bitstream is then ready for download into FPGA 200. Overlap with a default core configuration may be excluded from the instantiation of the configuration bitstream.

FIG. 9 is a block diagram depicting an exemplary embodiment of bank allocation 900. Bank allocation 900 is for embodiment of RPU 510 of FIG. 5. Bank allocation of RPU 110, which is a subset of bank allocation for RPU 510, shall be understood from the following description of bank allocation 900 for RPU 510.

FPGA 200 is divided up into banks of pins. Bank allocation is used to group pins with similar I/O characteristics into FPGA banks. FPGAs have a fixed number of pin groups or banks available, where all pins in a bank have the same I/O voltage levels and conform to a similar I/O standard. In addition, pins from the same block of support functions 300 may be physically grouped together to minimize or reduce the distance that signals within the block travel. In addition, certain groups of pins within a block of support functions 300 may include a clock pin in the same bank of FPGA 200 due to routing limitations within FPGA 200. Bank allocation 900 is particular to the above-referenced FPGA part from Xilinx, Inc., and thus other bank allocations may vary depending on the FPGA selected.

Bank 5, bank 9, and a portion of bank 13 may be used for communication with one of DRAMs 206, and bank 7, bank 11, and a portion of bank 15 may be used for communication with another of DRAMs 206. Another portion of bank 13 and bank 3 may be used for accessing an RLDRAM, which may be used instead of SRAM 202. Likewise, another portion of bank 15 and bank 4 may be used for another of such RLDRAMs. These RLDRAMs are illustratively shown in FIG. 5 as separate SRAMs 202.

Portions of banks 1, 6, and 10 may be used for an HT link 107, namely HT-2 link, and remaining portions of banks 1, 6, and 10 may be used for DRAM interface 304. A portion of bank 2 and a portion of bank 8 may be used for another HT link 107, namely HT-1 link, and remaining portions of banks 2 and 8 may likewise be used for DRAM interface 304. Portions of banks 12, 14, and 16 may be used for yet another HT link 107, namely HT-0 link, and remaining portions of banks 12, 14, and 16 may be used for DRAM interface 304.

However, regional clock pins are used in all banks except in banks 1 through 4. Furthermore, bank 0 (not illustratively shown) may be used for JTAG access and other control signals. Additionally, bank 1 may be used for CPLD control signals as well as JTAG signals.

Accordingly, it should be appreciated that no HT link shares any bank with any other HT link. This facilitates modularity in instantiating one or more HT links via HT interface 301. Accordingly, individual HT links may be brought up or down without affecting other HT links. Likewise, DRAM 206 busing may be coupled to two separate sets of banks to facilitate modularity of design for instantiating support for separate DRAMs 206 in DRAM interface 304. Furthermore, busing for SRAMs or RLDRAMs 202 may be coupled to two separate sets of banks to facilitate modularity of design for instantiating support for separate SRAMs or RLDRAMs 202 in SRAM or RLDRAM interface 303. Lastly, motherboard DRAM interfacing does not share any bank with any other memory of RPU 510 to facilitate modularity of design. This modularity may be useful for mapping to separate DRAMs or portions thereof of module memory 104 in DRAM interface 304.

FIG. 10 is a block diagram depicting an exemplary embodiment of an RPU 1000. RPU 1000 includes FPGA 200, DRAMs 206a and 206v, RLDRAMs 202a through 202d, CPLD 203, DRAM buses 215a and 215b, flash memory 204, and RAM 205, along with other components such as resistors, capacitors, power converters, buffers and oscillators which have been omitted for clarity. In one embodiment, FPGA 200 is an XC4VLX200-10FF1513C available from Xilinx, Inc.; however, there are numerous FPGAs available from Xilinx and other vendors such as Altera which would also be suitable. According to one embodiment, RLDRAMs 202a through 202d are MT49H16M18HT-33 parts from Micron Technology corporation, CPLD 203 is an XC2C384-7FTG256 from Xilinx, Inc., flash memory 204 is a RC28F256P30B85 from Intel corporation, and RAM 205 is a MT45W8MW16BGX-708WT from Micron Technology. In each case, there are numerous alternative components which could be used instead of those listed here.

FPGA 200 is connected through bus 211 and microprocessor socket 106 to module memory 104 of motherboard 120. In FIG. 2, buses 212 and 213 are illustratively shown as being the same bus for purposes of clarity and not limitation; however, for reasons described below in additional detail, separate buses 212 and 213 may be used. FPGA 200 is connected through bus 210 and socket 106 to microprocessor 101 of motherboard 120. In one embodiment, bus 210 is an HT bus capable of one or more HT links 107 of FIG. 2. HT bus 210 has high bandwidth and low latency characteristics and is available on microprocessor 101. Other buses such as PCI, PCI Express, or RapidIO could be used instead with the appropriate motherboard components for providing a microprocessor interface associated with a microprocessor socket 106. HT bus 210 may thus form a direct connection between microprocessor 101 and RPU 1000 without passing through any intermediate chips or buses. This direct connection may be used to enhance throughput and latency when transferring data to and from RPU 1000.

On motherboards that support multiple HT buses or links, there may be several HT buses 210 connected to the same or different microprocessors 101 or to other motherboard components. In one embodiment, microprocessor socket 106 and FPGA 200 support up to three 16-bit HT buses.

FPGA 200 connects to RLDRAMs 202a through 202d. RLDRAMs 202a through 202d are divided into two banks with two RLDRAMs in each bank. These two banks are supported by separate sets of banks of pins of FPGA 200 as described with reference to FIG. 9. The two banks are connected to FPGA 200 via memory buses 214a and 214b. RLDRAM devices are used in place of SRAM in one embodiment because they provide a combination of large capacity, low latency, and high bandwidth.

FPGA 200 is connected to CPLD 203 via dedicated configuration bus 212 and CPLD/FPGA bus 216. CPLD 203 additionally connects to flash memory 204 and RAM 205 via memory bus 213. CPLD 203, along with flash memory 204 and RAM 205, may be used to configure FPGA 200. Stored data to configure FPGA 200 may come either from flash memory 204 or RAM 205.

Flash memory 204 may be used to store configuration data that is infrequently changed or is to be retained when RPU 1000 is powered off. In contrast, RAM 205 may be used for configuration data that changes frequently. For example, a system where RPU 1000 is used to accelerate different mathematical algorithms at different times may involve the use of RAM 205 to enhance performance over the use of flash memory 204. In this type of system, configuration data may be transferred from microprocessor 101 over HT bus 210 through FPGA 200, over CPLD/FPGA bus 216, then through CPLD 203 and over memory bus 213 to RAM 205. Such configuration data may be stored in RAM 205, such as at least until it is used to reconfigure FPGA 200. During reconfiguration, the stored configuration data is transferred from RAM 205 over memory bus 213 to CPLD 203. CPLD 203 then reconfigures FPGA 200 over configuration bus 212. There are many ways to configure FPGA 200 including serial configuration, select map configuration with any of a variety of widths, and JTAG configuration. Select map configuration is described herein with respect to the exemplary embodiments; however, other configuration interfaces may be used in accordance with the description herein.

In order to more fully appreciate the description of the following embodiments, a description of reconfiguration prior to the advent of the following embodiments is provided.

In the past, rebooting an RPU, such as RPU 110 of FIG. 2 or RPU 510 of FIG. 5, involved two computers and one of two rather awkward sequences of events including manual actuation of a reset button. This type of reboot reconfiguration is to be distinguished from a normal configuration of FPGA 200 of either RPU 110 or RPU 510 from flash memory 204 at startup.

Figure 11:
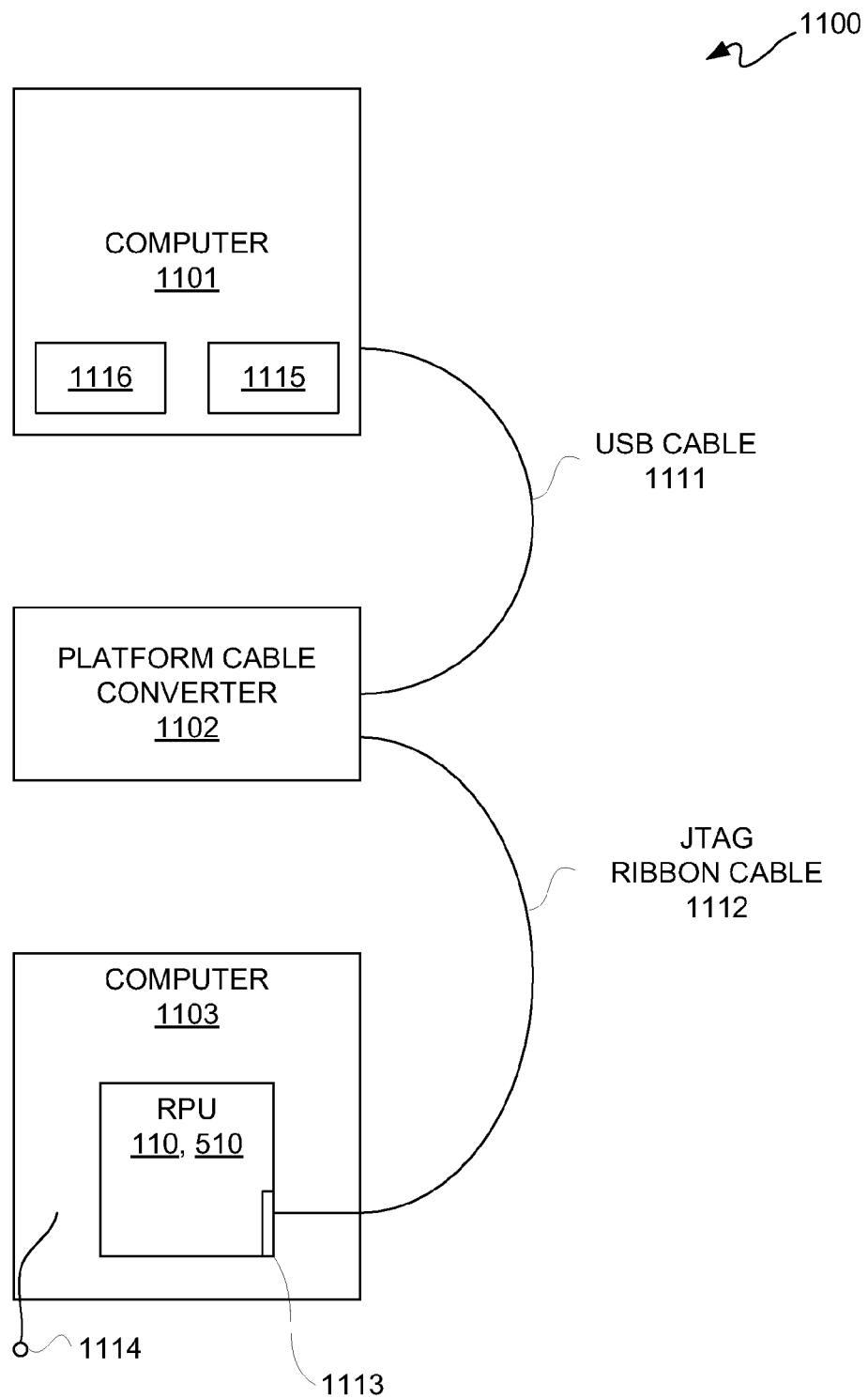
FIG. 11 is a block diagram depicting an exemplary embodiment of a computer system that uses a JTAG chain as part of a reconfiguration.

FIG. 11 is a block diagram depicting an exemplary embodiment of a computer system 1100 that uses a JTAG chain as part of a reconfiguration. Computer system 1100 includes computer 1101 and computer 1103, as well as a platform cable converter 1102. Computers 1101 and 1103 may be any of a variety of computers, such as workstations, client computers, notebooks, and the like. Computer 1101 is programmed for executing a program of a software tool 1115 used to configure and program one or more PLDs. Examples of such software tools include ISE iMPACT, ChipScope, Synplify Pro, or other PLD development and implementation software tool. Computer 1103 includes one or more RPUs, such as RPU 110 or RPU 510 for example. With continuing reference to FIG. 11 and renewed reference to FIGS. 2 and 5, use of computer system 1100 is further described.

In the past, rebooting an RPU, such as RPU 110 or 510, with a same or different configuration bitstream involved a remote logon from computer 1101 to access control of computer 1103. In other words, two computers were needed, where one included an RPU, such as RPU 110 or 510. Then, if computer 1103 was already powered on, a "halt" or "shutdown-h 0" command was issued, such as from computer 1101 or computer 1103, to halt operation of computer 1103 for a reconfiguration. In this example, computer 1101 is a Windows or Linux machine, and computer 1103 is a Linux machine. However, other operating systems may be used.

Then, from computer 1101 via a JTAG chain, a configuration bitstream 1116, stored for example on a hard disk drive or other sufficiently large storage medium of or accessible by computer 1101, was downloaded. Recall computer 1103 is halted and thus not capable of reading a hard disk drive for example. Such configuration bitstream was located for loading into FPGA 200 of an RPU, such as RPU 110 or 510, via a JTAG interface thereof. Again, the RPU being reconfigured via JTAG chain had to be in a separate computer, such as computer 1103 in the example of FIG. 11, from the computer used to provide the bitstream via the JTAG chain, such as computer 1101 in the example of FIG. 11.

Program 1115 may have been used for this loading of configuration bitstream 1116 into configuration memory of FPGA 200. This prior download was quite slow, as configuration bitstream 1116 was sent via Universal Serial Bus ("USB") cable 1111 to platform cable converter 1102, and then via JTAG ribbon cable 1112 to a JTAG connector 1113 and then to a JTAG interface (not shown) in FPGA 200 of RPU 110 or 510 in computer 1103. Platform cable converter 1102 converted USB signals to JTAG signals, such as voltage translation and other signal translation. An example of a platform cable converter is Platform Cable USB model DLC9 available from Xilinx, Inc.; however, other input signals to JTAG signal converters may have been used, such as Raven for example. Additionally, it should be understood that Xilinx, Inc. supplies a driver for use of the converter. A JTAG serial version of configuration bitstream 1116 was then streamed from platform cable converter 1102 to a JTAG connector 1113 of RPU 110 or 510 via JTAG ribbon cable 1112 for loading into FPGA 200 via a JTAG interface thereof.

After the download of configuration bitstream 1116 was completed, for example as indicated on a progress dialog screen display graphical user interface ("GUI") (not shown) provided by program 1115, then a user would depress and hold reset button 1114. After reset button 1114 was released, RPU 110 or 510 would reset FPGA 200 as reconfigured using configuration bitstream 1116 such that microprocessor 101, such as an Opteron for example, would again start communicating with RPU 110 or 510 once it is booted up.

Reset button 1114 may not be provided in an off-the-shelf version of computer 1103. Furthermore, reset button 1114 is not the same as a restart executed from an Operating System ("OS"). Recall, operation of computer 1103 was halted for this reboot sequence, and thus the OS was frozen. Furthermore, in electro-magnetic interference ("EMI")-shielded applications, use of reset button 1114 may be prohibited or impractical.

An alternative to this prior reconfiguration sequence was to power-on computer 1103 with reset button 1114 held in. This prevented microprocessor 101 from communicating with RPU 110 or 510. With reset button 1114 depressed, FPGA 200 was reconfigured as previously described using in part a JTAG chain. Once configuration bitstream 1116 was loaded into FPGA 200 via the JTAG chain, reset button 1114 was released. After which, the boot sequence proceeded as normal.

Figure 12:
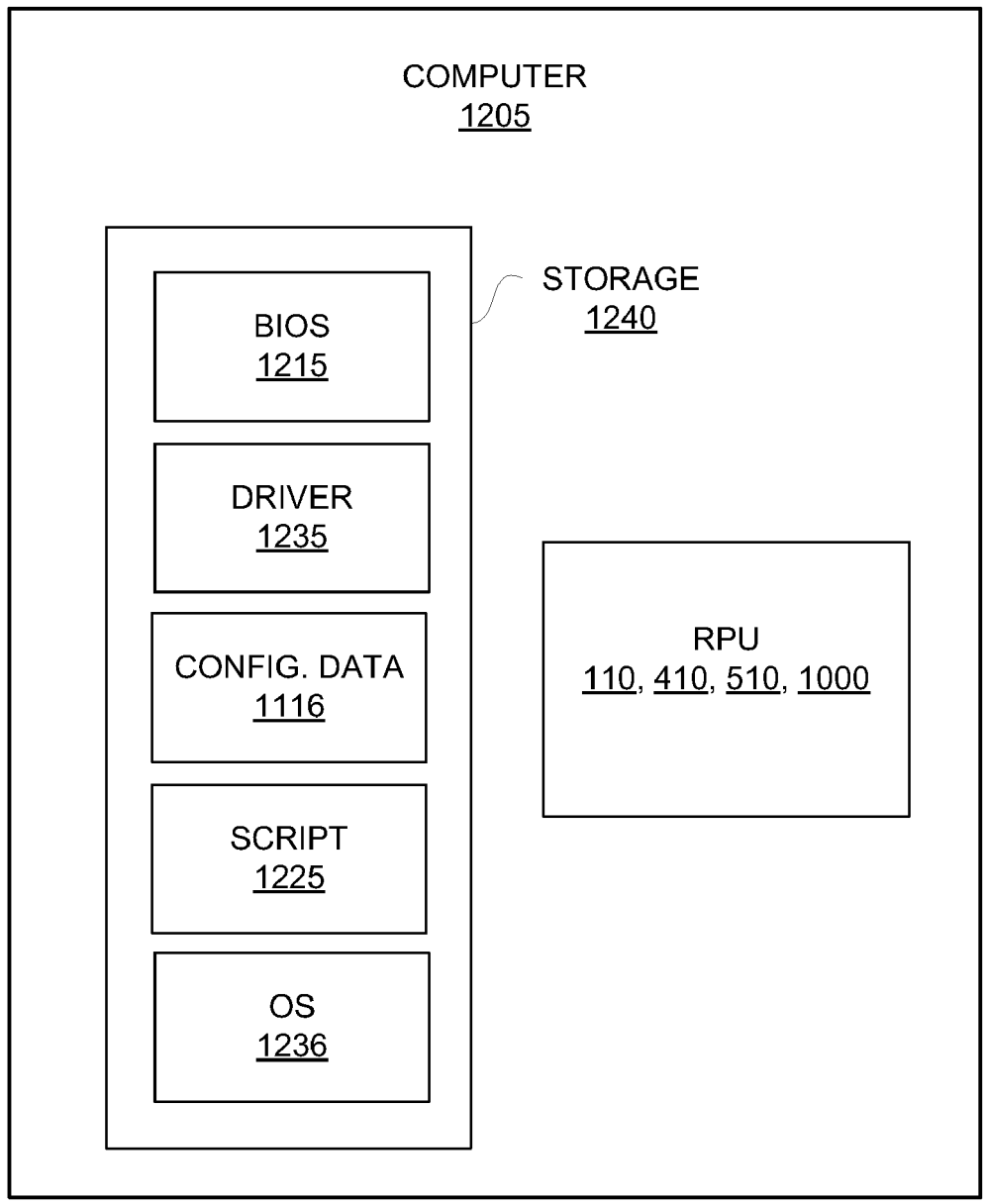
FIG. 12 is a block diagram depicting an exemplary embodiment of a computer configured for the sleep mode reconfiguration flow of FIG. 13.

FIG. 12 is a block diagram depicting an exemplary embodiment of a computer system ("computer") 1201. Computer 1201 is configured for a sleep mode reconfiguration. Computer 1201 may be computer system 100 of FIG. 1, and thus may include microprocessor 101 and South Bridge 1399, though not shown in FIG. 12 for purposes of clarity. Computer 1201 may include various forms of storage 1240 for storing driver 1235, BIOS 1215, configuration data ("configuration bitstream") 1116, script 1225, and OS 1236. One or more RPUs, such as RPUs 110, 410, 510, and 1000, may be installed in computer 1201.

Figure 13:
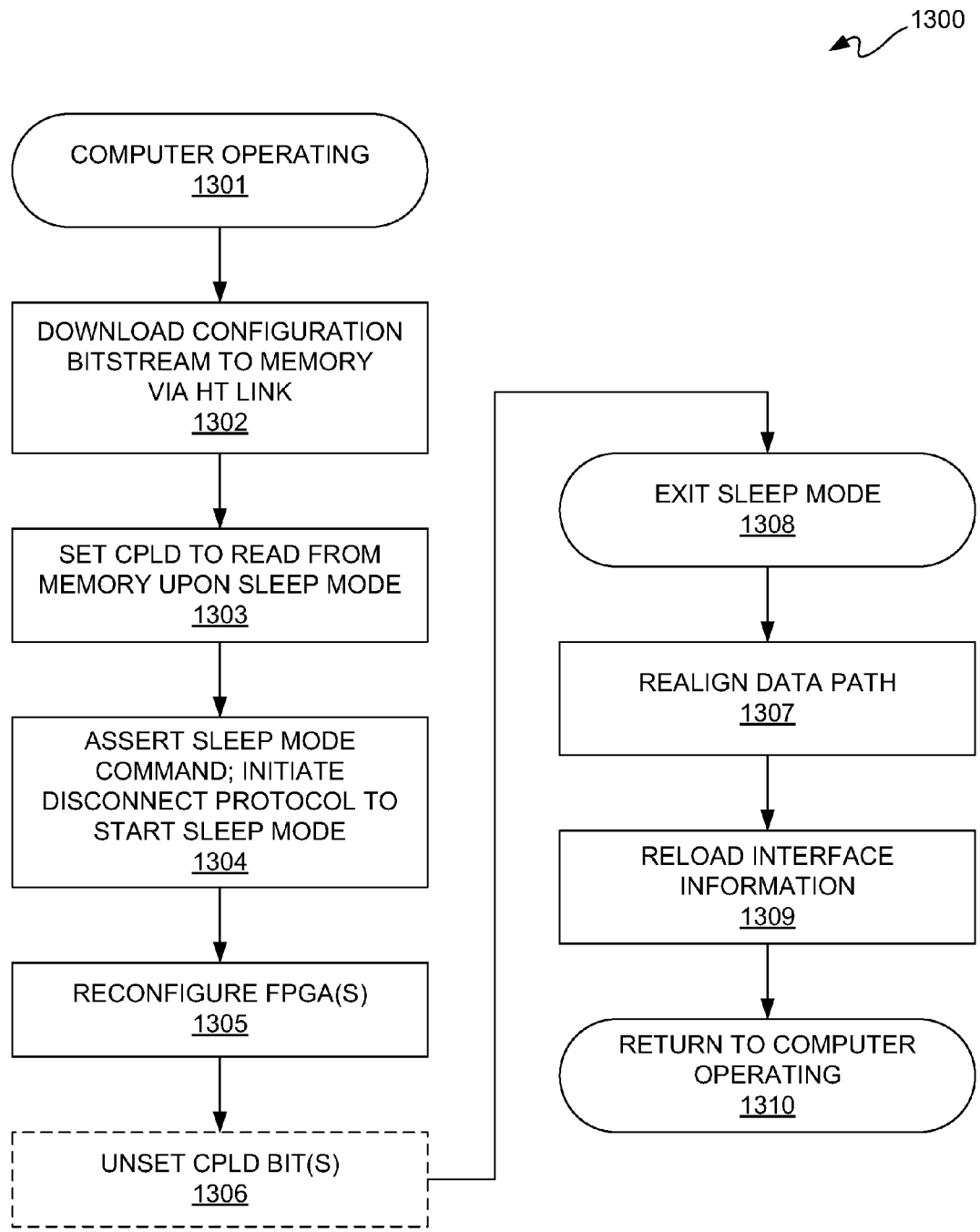
FIG. 13 is a flow diagram depicting an exemplary embodiment of a sleep mode reconfiguration flow.

FIG. 13 is a flow diagram depicting an exemplary embodiment of sleep mode reconfiguration flow 1300. Sleep mode reconfiguration flow 1300 is described with reference to each of FIGS. 1, 2, 4, 5, 12, and 13.

Sleep mode reconfiguration flow 1300 may be used for run-time reconfiguration of one or more RPUs, such as RPUs 110, 410, 510, and 1000. More particularly, sleep mode reconfiguration flow 1300 allows for runtime reprogramming of FPGA 200. Thus, sleep mode reconfiguration may be performed without powering down, resetting, or rebooting computer 1201 having one or more RPUs being reconfigured, namely "run-time" reconfigured. In other words, microprocessor 101 of computer 1201 need not be halted other than as part of an initiated sleep mode of such computer 1201.

By "sleep" mode it is generally meant a system or device mode in which a microprocessor is not actively or periodically communicating tokens or other information. For example, microprocessor 101 periodically issues cyclic redundancy checks ("CRCs") to other components of computer 1201, and during a sleep mode such CRC issuance by microprocessor 101 is halted. Furthermore, microprocessor 101 during a boot sequence may check for which ports are active, and if a port is not active, then such an inactive port may not be made active for purposes of communication with microprocessor 101 other than by a reboot. Thus, the ability to reconfigure one or more RPUs during a sleep mode avoids having to do so by rebooting computer 1201.

South Bridge 1399 may allow registers to be written to before microprocessor 101 is fully active. An example of a South Bridge that may be used with the Operton is a CK804 available from Nvidia, Inc. For purposes of clarity by way of example and not limitation, it shall be assumed that a CK804 South Bridge is used, even though other South Bridge chips may be used.

Computer 1201 includes at least one RPU. For purposes of clarity by way of example and not limitation, it shall be assumed that an RPU 110 is to be reconfigured. However, from the following description of reconfiguration of RPU 110, it shall be understood that another RPU may likewise be reconfigured. Additionally, even though only a single block is illustratively shown in computer 1201 for RPU 110 in FIG. 12, it should be understood that computer 1201 may have more than one RPU.

Sleep mode flow 1300 starts with computer 1201 in an operating state at 1301. At 1302, configuration bitstream 1116 is downloaded to memory, such as SRAM 202 of RPU 110, as initiated by script 1225.

Configuration bitstream 1116 may be stored in storage of computer 1201 or otherwise be accessible by computer 1201. Alternatively, configuration bitstream may be stored in non-volatile memory of RPU 110, and thus such downloading to SRAM 202 may be avoided for reconfiguration. However, for purposes of clarity and not limitation, reconfiguration of RPU from SRAM 202 shall be assumed. Additionally, computer 1201 has access to script 1225 and BIOS 1215. BIOS 1215 may be configured to write to registers of South Bridge 1399 during a boot or reboot cycle to precondition computer 1201 for a sleep mode reconfiguration, as described below in additional detail.

Script 1225 may be used to cause CPLD 203 to reconfigure one or more FPGAs, such as FPGA 200, to which CPLD 203 is coupled, responsive to a sleep mode. Driver 1235 may be configured to provide an interval of time ("window") during a sleep mode for reconfiguring. This window may be sufficient in time to allow FPGA 200 to be completely reconfigured prior to completion of the sleep mode time interval. For example, such a window may be approximately 2 to 3 seconds or less.

A file having configuration bitstream 1116 is loaded into SRAM 202 via an operable HT link of HT links 107. In contrast to the past, RPU 110 does not have to be halted prior to loading configuration data to RPU 110 for a subsequent reconfiguration of FPGA 200. Thus, an available operable HT link 107 in FPGA 200 may be used to load configuration bitstream 1116 from a storage location to SRAM 202. Use of an HT link 107 is substantially faster than loading using JTAG. An optional check may be made to determine that configuration bitstream 1116 was not corrupted prior to loading into SRAM 202. Alternatively or additionally, an optional check may be made to ensure that the HT link used by configuration bitstream 1116 matches an available HT link 107 of RPU 110.

Optionally, a user may specify "-device /dev/drcmod[01]" to direct configuration bitstream 1116 to load to a particular RPU in computer 1201, as more than one RPU may be present. If this argument is not specified, "/dev/drcmod0" may be used by default.

Once configuration bitstream 1116 is loaded into SRAM 202 of the designated RPU 110, at 1303 script 1225 may set a bit in a configuration register of CPLD 203 to cause CPLD 203 to access configuration data from SRAM 202 instead of flash memory 204 the next time CPLD 203 detects a sleep mode of computer 1201. Additionally, an address register of CPLD 203 may be set to a starting address in SRAM 202. For example, such an address register may be set to 0 to cause CPLD 203 to start reading from address 0 in SRAM 202. Of course, an address other than address 0 may be used.

If a flag is set in script 1225, a system sleep mode of computer 1201 may be automatically caused. Alternatively, a user may initiate a sleep mode of computer 1201. If a user does not invoke an automatic sleep mode, control is returned to the user. A user might not want to immediately invoke a sleep mode of computer 1201. For example, in a multi-RPU computer system, not all SRAMs of the all RPUs may have finished pre-loading configuration data 1116. A "-skip" flag may optionally be provided. Such a "-skip" flag may be used for example when a DMA/arbitration block ("DMA engine") 302 instantiated in FPGA 200 is no longer functioning, as script 1225 optionally uses DMA engine 302 to read back and verify the integrity of configuration data 1116 written to SRAM 202.

At 1304, a sleep mode command, either automatically by script 1225 or by a user, is asserted. Responsive to assertion of a sleep command, South Bridge 1399 sends a stop clock request packet to microprocessor 101. This stop clock request packet is broadcast to all affected devices including RPU 110. In reply, microprocessor 101 may send a stop clock grant packet to South Bridge 1399.

In response to receiving this stop clock grant packet, South Bridge 1399 initiates holding down of the LDTSTOP# signal. South Bridge 1399 also may initiate disconnect protocol packets to start disconnect procedure before going into the sleep mode which will affect components of computer 1201, including RPU 110. Conventionally, the disconnect protocol involves broadcasting a predetermined control packet with a disconnect bit set to cause all affected components to go into a sleep state.

However, rather than going into a sleep state, CPLD 203, in response to FPGA 200 receiving such a sleep mode control packet from South Bridge 1399 and toggling a reconfiguration signal to CPLD 203, initiates reconfiguration of one or more FPGAs 200 at 1305. Again, CPLD 203 has been preconditioned by script 1225 to reconfigure FPGA 200 from SRAM 202 on a next detected sleep mode.

At 1305, for each CPLD 203 in which the configure-from-SRAM bit is set, set PCI ("setpci") commands are run to bring each associated HT link 107 down. This is done in anticipation of a replacement reconfigurable processor system core ("RPSysCore") being instantiated in FPGA 200. Prior to HT links 107 being disconnect, HT links 107 may be brought down to operate at a slow frequency with a smaller bit width. For example, an HT link 107 may be brought down from an operational link speed/bit-width down to a negotiating a link speed/bit-width. For example, an HT link 107 may be brought down for starting link negotiation at 200 MHz/8 bits ("200/8").

Computer 1201 is held in a sleep mode at 1305 at least long enough for CPLD 203 to reconfigure each targeted FPGA 200 via configuration data 1116 stored in each associated SRAM 202. If a user does not wish to execute such a reconfiguration after each sleep mode of computer 1201, then optionally at 1306 such setting in CPLD 203 may be unset. Moreover, optionally at 1306, the configure-from-SRAM bit set in CPLD 203 may be unset. By unsetting the configure-from-SRAM bit, CPLD 203 is updated so that it may reconfigure FPGA 200 from flash memory 204 instead of SRAM 202.

Moreover, if reconfiguration from SRAM 202 does not succeed, a done pin of FPGA 200 is not asserted. CPLD 203 may be configured to monitor such done pin and to initiate a reconfiguration from flash memory 204 if the done pin is not asserted by FPGA 200 after a reconfiguration via SRAM 202 has timed out. Along those lines, driver 1235 may be configured to cause the South Bridge 1399 to maintain the sleep mode longer to allow for a "configure-from-SRAM failed so configure-from-flash" sequence, if such additional configuration time takes longer than the window of time allocated for a sleep mode reconfiguration from SRAM sequence. However, for purposes of clarity and not limitation, it shall be assumed that either configuration from flash memory 204 or reconfiguration from SRAM 202 is performed. Bits may be unset in CPLD 203 responsive to FPGA 200 issuing a done signal after a successful configuration or reconfiguration operation.

At 1308, depending on the amount of time allotted for a sleep mode as set in registers of South Bridge 1399, the sleep mode times out. In other words, a sleep mode of computer 1201 is exited at 1308.

After configuration or reconfiguration of FPGA 200, data path realignment is performed at 1307. Realignment may involve providing an alignment bit pattern to delineate MSBs and LSBs to synchronize one or more HT links 107. The alignment pattern may be sent by RPU 110 via a low-level bus to microprocessor 101.

Immediately after exiting a sleep mode at 1308, namely immediately after LDTSTOP# is released, there may be an interval of approximately 100 clock cycles during which RPU 110 may send the alignment pattern via a low-level bus to microprocessor 101 for realignment at 1307. After exiting sleep mode at 1308, microprocessor 101 may send an alignment packet to RPU 110 at 1307. In other words, HT links 107 are bi-directional, and thus alignment is for both directions.

Due to reconfiguration of FPGA 200, interface data for FPGA 200 to communicate with microprocessor 101 and other components of computer 1201 may have been erased. For example, RPU 110 may use PCI interface information provided to it. This PCI interface information that may be written to registers of FPGA 200 may include one or more interrupt addresses, and one or more base addresses, among other interface information.

Figure 14:
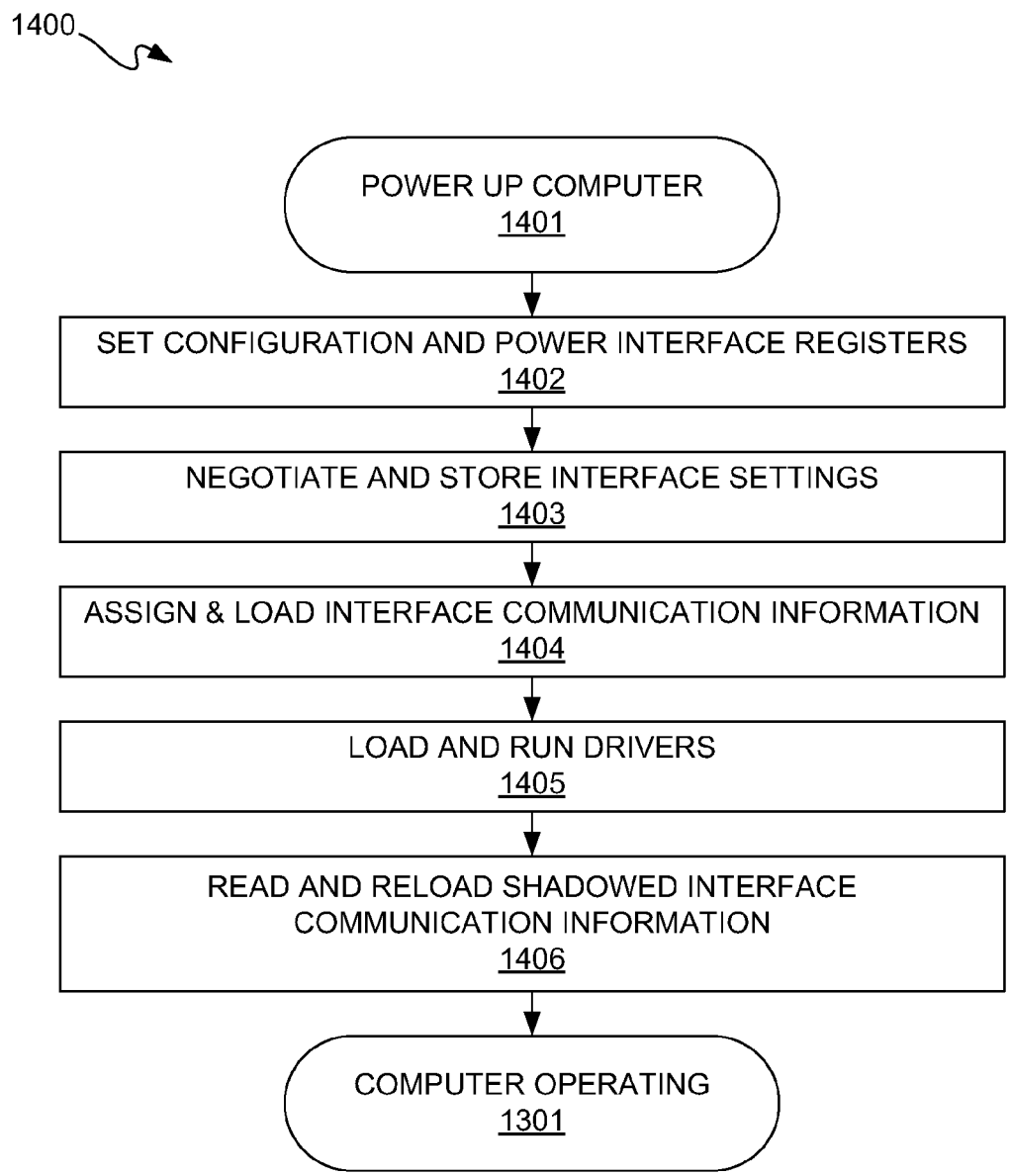
FIG. 14 is a flow diagram depicting an exemplary embodiment of a sleep mode reconfiguration preconditioning flow.

At 1309, interface information, which is previously stored as described below in additional detail with reference to FIG. 14, is reloaded. This reloading of interface information may be performed after exiting of a sleep mode at 1308. At 1310, computer 1201 may return to an operating state, but with RPU 110 having been reconfigured.

FIG. 14 is a flow diagram depicting an exemplary embodiment of a sleep mode reconfiguration preconditioning flow ("preconditioning flow") 1400. Preconditioning flow 1400 is described with reference to FIGS. 2, 4, 5, 12, 13, and 14. At 1401, computer 1201 is powered up.

Operations 1402 through 1404 may be associated with BIOS 1225. At 1402, configuration and power interface registers, such as of South Bridge 1399, are set. For the above-described embodiment of a South Bridge, these may be Advanced Configuration and Power Interface ("ACPI") registers. Such registers are for controlling powering up and powering down of devices of computer 1201, including controlling a sleep mode.

For purposes of clarity by way of example and not limitation, it shall be assumed that an RPU 110 of computer 1201 is to be reconfigured along the lines of reconfiguration flow 1300 of FIG. 13. Again, for purposes of clarity and not limitation, it will be assumed that RPU 110 is used, even though RPU 410, 510, OR 1000 may be used.

For setting sleep mode configuration via ACPI registers, BIOS 1225 may be configured to reset a counter. For example, a 24-bit or other bit size timer may be reset to zero before entering a sleep mode, which effectively may translate into a sleep state of approximately 2 to 3 seconds or less. For example, a free running clock and counter may continuously operate during a sleep state to cause a register to issue a power event signal, namely a wake-up signal, such that computer 1201 comes out of a sleep mode within a specified time. For purposes of clarity and not limitation, it shall be assumed that ACPI registers are reset by BIOS 1225, even though an API may be used to reset such counter.

At 1403, interface settings are negotiated. This includes negotiating width and frequency for communication with RPU 110. CPLD 203 may store the result of this negotiation, namely store the settings. CPLD 203 informs FPGA 200 of the result of such negotiation, and FPGA 200 in response may set itself to such negotiated state. Thus, reconfiguration of FPGA 200 at 1305 may further include setting a communication interface back to a previously negotiated state. CPLD 203 may inform FPGA 200 of a negotiated state to reset to in reply to FPGA 200 asserting a configuration done signal to CPLD 203. This allows FPGA 200 to come out of a sleep mode in a negotiated state. Alternatively, a configuration bitstream for reconfiguration of FPGA 200 may include a default state, including a default communication interface bit width and frequency. However, this alternative involves prior knowledge of computer 1201 into which RPU 110 is to be installed for incorporation into such configuration bitstream.

At 1404, interface communication information is assigned and loaded. For example, interrupt addresses for RPU 110 to interrupt microprocessor 101 may be assigned by BIOS 1215, or optionally OS 1236, and stored in FPGA 200. Continuing the above example, one or more interrupt addresses, one or more base addresses, one or more vector addresses, and one or more buffer credit addresses may be loaded into PCI registers of FPGA 200 of RPU 110. However, this interface communication information may be erased when FPGA 200 is reconfigured at 1305.

Operations 1405 and 1406 may be associated with OS 1236. At 1405, drivers for computer 1201 are loaded and run by OS 1236. The drivers may include a driver 1235 for RPU 110. Driver 1235 may be configured to instruct FPGA 200 to read out the interface communication information loaded at 1404 for shadow storage in memory, such as module memory 104. More particularly, such interface communication information may be shadow stored in kernel memory of OS 1236 memory 104. Driver 1235 may be configured to perform a readback of interface communication information stored in module memory 104 after exiting a sleep mode. In other words, driver 1235, which is initially executed by microprocessor 101, writes to South Bridge 1399, which causes microprocessor 101 to go into a sleep mode. After exiting the sleep mode, microprocessor 101 resumes executing driver 1235. Driver 1235 as part of such resumed execution causes shadowed interface communication information to be read at 1406 from module memory 104 and to reload back into FPGA 200. An instruction of driver 1235 may include an input/output control ("IOCTL") call. Computer 1201 may then be in an operating state 1301.

Thus, it should be appreciated that one or more RPUs in a computer may be reconfigured without having to reset or reboot the computer. Moreover, such one or more RPUs may be reconfigured responsive to a sleep mode, in contrast to a resetting or rebooting of a computer.

Even though separate integrated circuits have been illustratively shown for purposes of implementing an RPU, it should be appreciated that an RPU as described herein may be integrated as a single chip. For example, for additional error handling capability, there may be more than one set of configuration data stored in flash memory 204. There may be a user-generated set of configuration data stored in flash memory 204 and a default factory set of configuration data stored in flash memory 204. Thus, after an unsuccessful reconfiguration from SRAM 202, a subsequent cycle of reconfiguration may proceed from a user-generated set of configuration data stored in flash memory 204. If reconfiguration from flash memory 204 using user-generated configuration data was unsuccessful, then another reconfiguration may be performed from flash memory 204 using the default factory set of configuration data.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof.

Claim(s) listing steps do not imply any order of the steps. Trademarks are the property of their respective owners.

What is claimed is:

1. A method for reconfiguration of an accelerator module, comprising:
  putting a computer into a sleep mode, the computer having the accelerator module installed therein;
  the accelerator module preconditioned to reconfigure a programmable logic device thereof responsive to assertion of a sleep mode command; and
  reconfiguring the programmable logic device of the accelerator module while the computer is in the sleep mode.

2. The method according to claim 1, further comprising:
  realigning a data path for synchronous communication from the accelerator module to a microprocessor of the computer, the data path having been previously aligned prior to the reconfiguring; and
  reloading base and interrupt address information into the programmable logic device, the programmable logic device having been previously loaded with the base and interrupt address information prior to the reconfiguring.

3. The method according to claim 2, further comprising sending a realignment packet by the accelerator module to the microprocessor after exiting the sleep mode.

4. The method according to claim 2, further comprising sending a realignment packet by the accelerator module to the microprocessor prior to exiting the sleep mode.

5. The method according to claim 2, wherein:
the realigning is performed prior to exiting the sleep mode; and
the reloading is done after exiting the sleep mode.

6. The method according to claim 2, wherein the reloading is responsive to a driver call by a driver script associated with the accelerator module.

7. The method according to claim 6, wherein the base and interrupt address information is stored in system memory responsive to execution of the driver script.

8. The method according to claim 7, wherein the base and interrupt address information is stored in a kernel memory location in the system memory.

9. A method for reconfiguration of a programmable logic device, comprising:
coupling the programmable logic device to a first microprocessor socket for communication with a microprocessor coupled to a second microprocessor socket;
preconditioning the programmable logic device to reconfigure responsive to assertion of a sleep mode command; and
reconfiguring the programmable logic device at runtime while coupled to the first microprocessor socket while the microprocessor is in a sleep mode responsive to assertion of the sleep mode command.

10. The method according to claim 9, wherein the reconfiguration is performed after configuring the programmable logic device.

11. The method according to claim 10, wherein the reconfiguring is a partial reconfiguration of the programmable logic device after the configuring.

12. The method according to claim 11, wherein the first microprocessor socket and the second microprocessor socket are directly connected to one another for direct communication between the microprocessor and the programmable logic device.

13. A method for reconfiguring an accelerator module having a programmable logic device, comprising:
coupling the accelerator module to a central processing unit interface of a computer;
configuring programmable logic of the programmable logic device with a first configuration bitstream;
preconditioning the accelerator module to reconfigure the programmable logic responsive to assertion of a sleep mode command;
transitioning the computer from an operating state to a sleep mode responsive to assertion of the sleep mode command; and
reconfiguring the programmable logic of the programmable logic device during runtime of the computer with either the first configuration bitstream or a second configuration bitstream without having to reboot the computer between the configuring and the reconfiguring;
wherein the reconfiguring is performed while the computer is the sleep mode; and
exiting the sleep mode after completion of the reconfiguring.

14. The method according to claim 13, wherein the transitioning includes:
asserting the sleep mode command;
initiating a protocol to start the sleep mode;
sending a stop clock request from a hub to a microprocessor of the computer responsive to the sleep mode command;
sending the stop clock request to the accelerator module;
sending a stop clock grant from the microprocessor to the hub;
holding down a stop signal responsive to the stop clock grant; and
initiating the reconfiguring responsive to the sleep mode command.

15. The method according to claim 14, further comprising:
releasing the stop signal for the exiting of the sleep mode;
realigning a data path between the microprocessor and the accelerator module upon the exiting of the sleep mode; and
reloading interface information into the programmable logic device.

16. The method according to claim 13, further comprising:
bringing microprocessor interface links down in speed from an operational link status to a negotiation link status during the sleep mode;
wherein the reconfiguring includes instantiating a replacement reconfigurable processor system core in the programmable logic.

17. The method according to claim 13, wherein the reconfiguring is completed within a time window during the sleep mode.

18. A method for reconfiguration of an accelerator module coupled to a bus, comprising:
preconditioning the accelerator module to reconfigure programmable logic of the accelerator module responsive to assertion of a sleep mode command;
putting the bus into a sleep mode in response to assertion of the sleep mode command; and
reconfiguring programmable logic of the accelerator module while the bus is in the sleep mode.

19. The method according to claim 18, wherein the bus is for communication with a microprocessor via a bridge.

20. The method according to claim 18, wherein the bus is put into the sleep mode under control of a bridge.

21. The method according to claim 20, wherein the bus is a PCIe bus.

22. A method for reconfiguration, comprising:
providing an accelerator module coupled to a bus; and
providing a script for conditioning the accelerator module for reconfiguration during a sleep mode;
preconditioning the accelerator module to reconfigure programmable logic of the accelerator module responsive to assertion of a sleep mode command;
wherein the bus is put into the sleep mode responsive to assertion of the sleep mode command; and
wherein the programmable logic of the accelerator module is reconfigured while the bus is in the sleep mode.

23. The method according to claim 22, wherein the bus is for communication with a microprocessor via a bridge.

24. The method according to claim 22, wherein the bus is put into the sleep mode under control of a bridge.

25. The method according to claim 24, wherein the bus is a PCIe bus.

* * * * *